United States Patent
Tanigawa

(10) Patent No.: US 7,796,783 B2
(45) Date of Patent: Sep. 14, 2010

(54) MOTION DETECTION DEVICE AND METHOD, LUMINANCE/CHROMINANCE SIGNAL SEPARATION DEVICE AND METHOD, NOISE REDUCTION DEVICE AND METHOD, AND VIDEO DISPLAY DEVICE AND METHOD

(75) Inventor: Satoru Tanigawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 12/276,842

(22) Filed: Nov. 24, 2008

(65) Prior Publication Data

US 2009/0091659 A1    Apr. 9, 2009

Related U.S. Application Data

(62) Division of application No. 10/898,970, filed on Jul. 27, 2004, now abandoned.

(30) Foreign Application Priority Data

Aug. 5, 2003    (JP) ............... 2003-286465

(51) Int. Cl.
*G06K 9/00*    (2006.01)
(52) U.S. Cl. ............... 382/107; 382/236; 348/155
(58) Field of Classification Search ............... 382/107, 382/236; 348/155, 448, 452, 701
See application file for complete search history.

(56) References Cited

U.S. PATENT DOCUMENTS 5,221,966 A    6/1993    Clayton et al.

| | | | |
|---|---|---|---|
| 5,786,872 A | 7/1998 | Miyazaki et al. |
| 5,886,745 A | 3/1999 | Muraji et al. |
| 6,008,866 A | 12/1999 | Komatsu |
| 6,999,130 B2 | 2/2006 | Tanigawa |

FOREIGN PATENT DOCUMENTS

| CN | 1416279 A | 5/2003 |
|---|---|---|
| JP | 63-206090 A | 8/1988 |
| JP | 3-14388 A | 1/1991 |
| JP | 4-123591 A | 4/1992 |
| JP | 6-86104 A | 3/1994 |
| JP | 7-75125 A | 3/1995 |
| JP | 8-46925 A | 2/1996 |
| JP | 10-108039 | 4/1998 |
| JP | 11-146417 A | 5/1999 |
| JP | 2001-160909 A | 6/2001 |
| JP | 2003-9092 A | 1/2003 |

OTHER PUBLICATIONS

Office Action issued in corresponding Japanese Patent Application No. 2003-286465, dated Nov. 21, 2006.

*Primary Examiner*—John B Strege
(74) *Attorney, Agent, or Firm*—McDermott Will & Emery LLP

(57) ABSTRACT

The motion detection device includes an oblique correlation detection section, a motion detection section and a motion determination section. The oblique correlation detection section detects a correlation in an oblique direction (oblique correlation) of a composite video signal. The motion detection section detects a motion amount based on an inter-frame difference of the composite video signal. The motion determination section determines the presence/absence of a motion in the composite video signal based on the motion amount detected by the motion detection section. The motion determination section determines the presence/absence of the motion considering the detection results of the oblique correlation by the oblique correlation detection section.

22 Claims, 18 Drawing Sheets (There is an oblique correlation···1,
No oblique correlation···0)

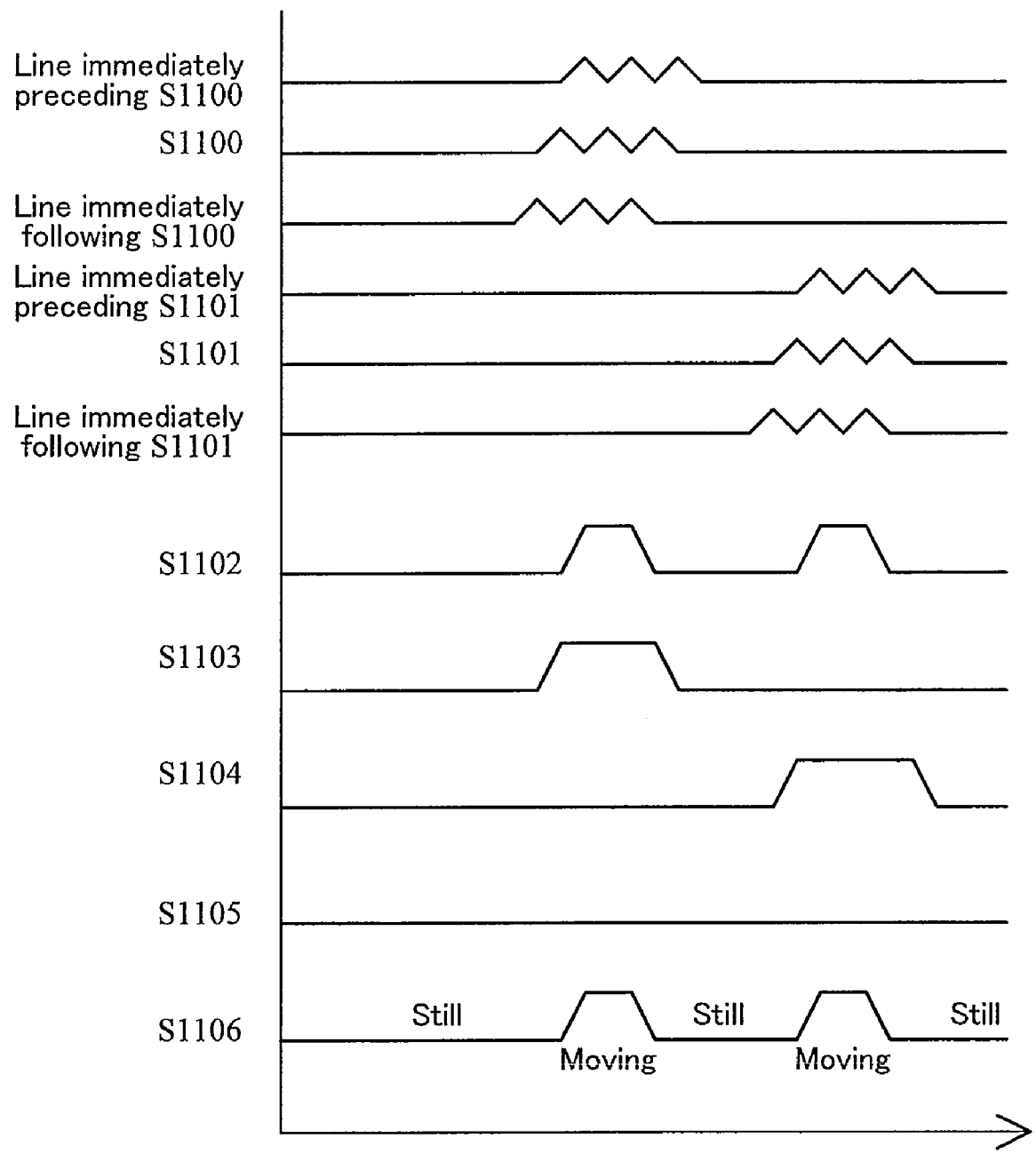

MOTION DETECTION DEVICE AND METHOD, LUMINANCE/CHROMINANCE SIGNAL SEPARATION DEVICE AND METHOD, NOISE REDUCTION DEVICE AND METHOD, AND VIDEO DISPLAY DEVICE AND METHOD

RELATED APPLICATIONS

This application is a Divisional of U.S. application Ser. No. 10/898,970, filed Jul. 27, 2004 now abandoned, claiming priority of Japanese Application No. 2003-286465, filed Aug. 5, 2003, the entire contents of each of which are hereby incorporated by reference.

BACKGROUND OF THE INVENTION

The present invention relates to a device and method for detecting a motion amount from a video signal, and a luminance/chrominance signal separation device and method, a noise reduction device and method, and a video display device and method adopting the motion detection device and method.

In recent years, as TV receivers have been upsized and enhanced in image quality, higher importance has been increasingly placed on enhancing the performance of a luminance/chrominance signal (Y/C) separation device that separates a luminance signal and a chrominance signal from a composite video signal. In a type of luminance/chrominance signal separation device called a three-dimensional YC separation device, switching between two-dimensional YC separation using line correlation and three-dimensional YC separation using frame correlation is made according to the results of motion detection. Therefore, high importance has also been placed on enhancing the performance of a motion detection circuit.

A conventional motion detection device and luminance/chrominance signal separation device will be described.

FIG. 20 is a block diagram of a motion processing circuit disclosed in Japanese Laid-Open Patent Publication No. 10-108039. Referring to FIG. 20, an input composite video signal S1100, as a current frame signal, is sequentially supplied to a frame memory 1101 and a motion detection circuit 1102, and also to a first edge detection circuit 1103. The frame memory 1101 holds the current frame signal for one frame period and then supplies the signal as a one-frame preceding frame signal S1101 to the motion detection circuit 1102 and a second edge detection circuit 1104. A determination circuit 1105 is composed of an AND circuit for calculating logical AND of the inputs from the first edge detection circuit 1103 and the second edge detection circuit 1104. An adaptive processing circuit 1106 attenuates a motion signal S1102 according to a signal S1105 output from the determination circuit 1105.

The operation of the motion detection device configured as described above is as follows.

FIG. 21 represents a situation of the motion processing circuit shown in FIG. 20 in which the input signal S1100 includes an edge portion and the edge portion has shifted from the position thereof in the one-frame preceding signal S1101. The motion signal S1102 output from the motion detection circuit 1102 indicates that the edge portion has shifted. The first and second edge detection circuits 1103 and 1104 respectively detect the edge and output edge detection signals S1103 and S1104. Since the edge portions of these signals do not overlap each other, the determination circuit 1105 outputs 0 as the determination signal S1105. With the determination signal S1105 of 0, the motion signal S1102 is output as it is as a signal S1106.

FIG. 22 represents another situation of the motion processing circuit shown in FIG. 20 in which the input signal S1100 contains an oblique component. The motion signal S1106 is output in the manner described with reference to FIG. 21.

However, the motion processing circuit described above fails to distinguish the case of input of an oblique portion from the case of input of an edge portion in the detection of an edge portion. Therefore, the conventional motion processing circuit is not allowed to correct or attenuate the motion amount as the motion detection results when an oblique component is input.

When the motion processing circuit described above is applied to a type of luminance/chrominance signal separation device in which switching between two-dimensional YC separation using line correlation and inter-frame YC separation using frame correlation is made according to the output signal of the motion processing circuit, it is not allowed to perform switching between the line correlation and the frame correlation according to the amount of oblique components. In other words, it is not allowed to attenuate the motion amount so as to be determined as being "still" or change the threshold for motion determination when the signal contains an oblique component. In this situation, when a signal containing a large amount of oblique components is input, it is not possible to reduce cross-color, which occurs due to mixing of a luminance component into a chrominance component during separation of a luminance signal and a chrominance signal from a composite video signal.

SUMMARY OF THE INVENTION

An object of the present invention is providing a motion detection device and method operable to improve the motion detection precision when a signal containing an oblique component is input.

Another object of the present invention is providing a luminance/chrominance signal separation device and method operable to reduce cross-color occurring due to leakage of a luminance signal component to a chrominance signal component even when a luminance signal having a correlation in an oblique direction is input.

The motion detection device of the present invention includes: an oblique correlation detection section for detecting an oblique correlation of a composite video signal; a motion detection section for detecting a motion amount based on an inter-frame difference of the composite video signal; and a motion determination section for determining the presence of a motion in the composite video signal based on the motion amount detected by the motion detection section, wherein the motion determination section determines the presence of a motion considering the detection results of the oblique correlation obtained by the oblique correlation detection section.

The motion detection method of the present invention includes the steps of: (a) detecting an oblique correlation of a composite video signal; (b) detecting a motion amount based on an inter-frame difference of the composite video signal; and (c) determining the presence of a motion in the composite video signal based on the motion amount detected in the step (b), wherein in the step (c), the presence of a motion is determined considering the detection results of the oblique correlation obtained in the step (a).

According to the motion detection device and method of the present invention, an oblique-direction correlation of an input composite video signal is detected, and motion determination is changed according to the results of this detection. This makes it possible to improve the motion detection precision of a video signal having a large amount of oblique-direction correlations.

When the motion detection device and method of the present invention are used for a luminance/chrominance signal separation device and method, switching is made between the inter-line luminance/chrominance signal separation output and the inter-frame luminance/chrominance signal separation output based on the motion determination changed according to the detection results of oblique correlation. Therefore, the motion determination for a signal containing a large amount of oblique components is performed in favor of the frame correlation luminance/chrominance signal separation. Accordingly, even in the event that an oblique-direction luminance signal component like an oblique line is input into the line correlation luminance/chrominance signal separation section, and fails to be correctly separated by the line correlation luminance/chrominance signal separation section, leaking to the line correlation output chrominance signal, occurrence of cross-color can be minimized in the output chrominance signal, and thus the image quality can be improved.

The motion detection device of the present invention is applicable to a Y/C separation device and a noise reduction device, and further to a TV receiver, a liquid crystal TV set, a plasma display TV set, an organic EL TV set, a video capture board, a personal computer, a videocassette recorder and the like that incorporate the Y/C separation device and the noise reduction device.

BRIEF DESCRIPTION OF THE DRAWINGS

FIG. 22 is a waveform chart illustrating the operation performed when an oblique line is input into the conventional motion processing circuit.

DESCRIPTION OF THE PREFERRED EMBODIMENTS

Figure 1:
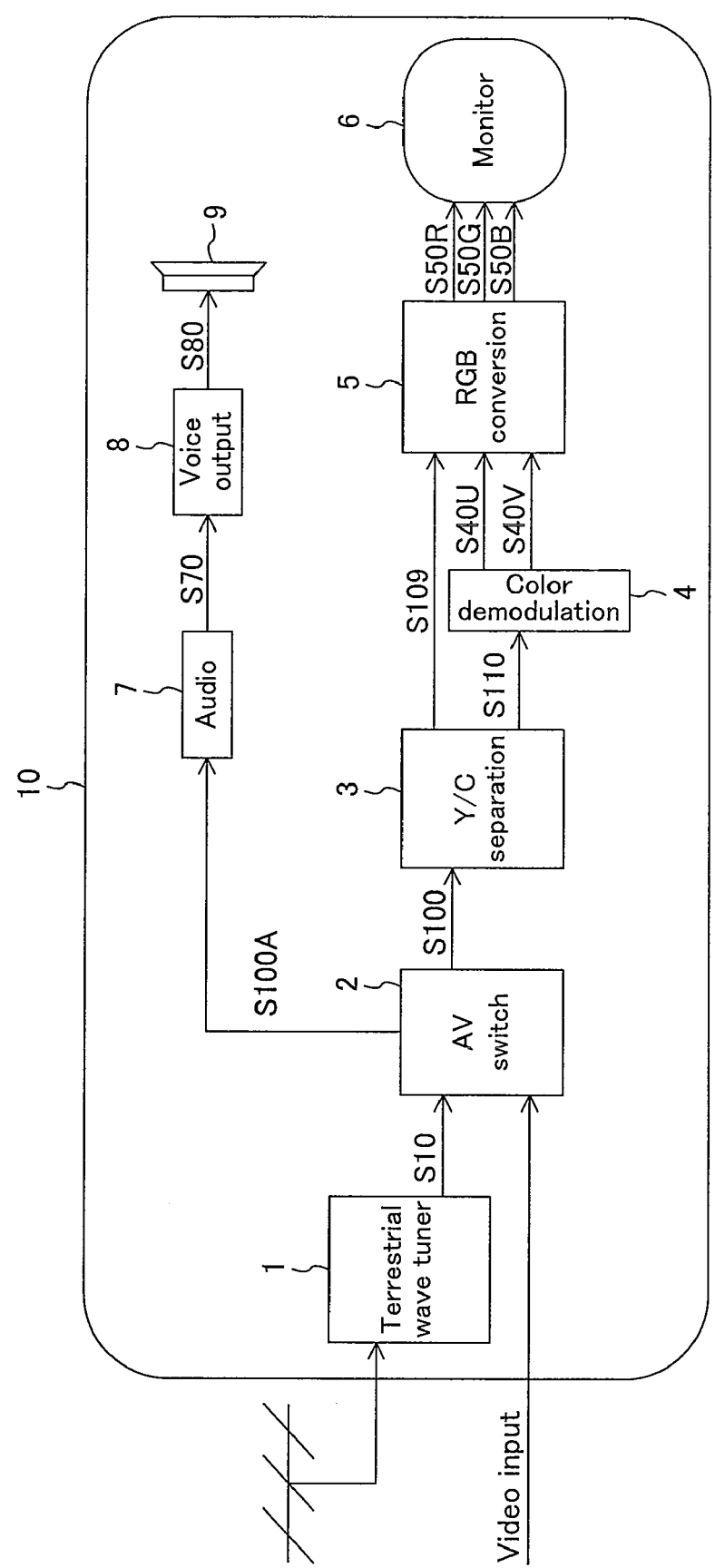
FIG. 1 is a block diagram showing the entire construction of a TV receiver in Embodiment 1 of the present invention.

Hereinafter, preferred embodiments of the present invention will be described in detail with reference to the accompanying drawings. Note that identical or corresponding components are denoted by the same reference numerals throughout the drawings, and the description of such components is not repeated.

Embodiment 1

Entire Construction of TV Receiver

FIG. 1 shows the entire construction of a TV receiver in Embodiment 1. The TV receiver, denoted by the reference numeral 10, includes a terrestrial wave tuner 1, an AV switch 2, a Y/C separation device 3, a color demodulation circuit 4, a RGB conversion circuit 5, a monitor 6, an audio processing circuit 7, a voice output circuit 8 and a speaker 9.

The terrestrial wave tuner 1 receives broadcasts allocated for respective channels. The AV switch 2 switches between the terrestrial wave broadcasts S10 received via the tuner 1 and video signals/audio signals (video inputs) received from external equipment such as a videocassette recorder. The Y/C separation device 3 separates a composite video signal S100 output from the AV switch 2 into a luminance signal S109 and a chrominance signal S110. The color demodulation circuit 4 demodulates the chrominance signal S110 output from the Y/C separation device 3 into a U signal S40U and a V signal S40V as color-difference signals. The RGB conversion circuit 5 converts the luminance signal S109 output from the Y/C separation device 3 and the U signal S40U and the V signal S40V output from the color demodulation circuit 4 into a R signal S50R, a G signal S50G and a B signal S50B. The monitor 6 displays an image from the R signal S50R, the G signal S50G and the B signal S50B output from the RGB conversion circuit 5. The audio processing circuit 7 processes an audio signal S100A output from the AV switch 2. The voice output circuit 8 amplifies an audio signal S70 output from the audio processing circuit 7 and outputs an amplified audio signal S80 to the speaker 9. The speaker 9 outputs the audio signal S80 externally.

Internal Configuration of Y/C Separation Device 3

Figure 2:
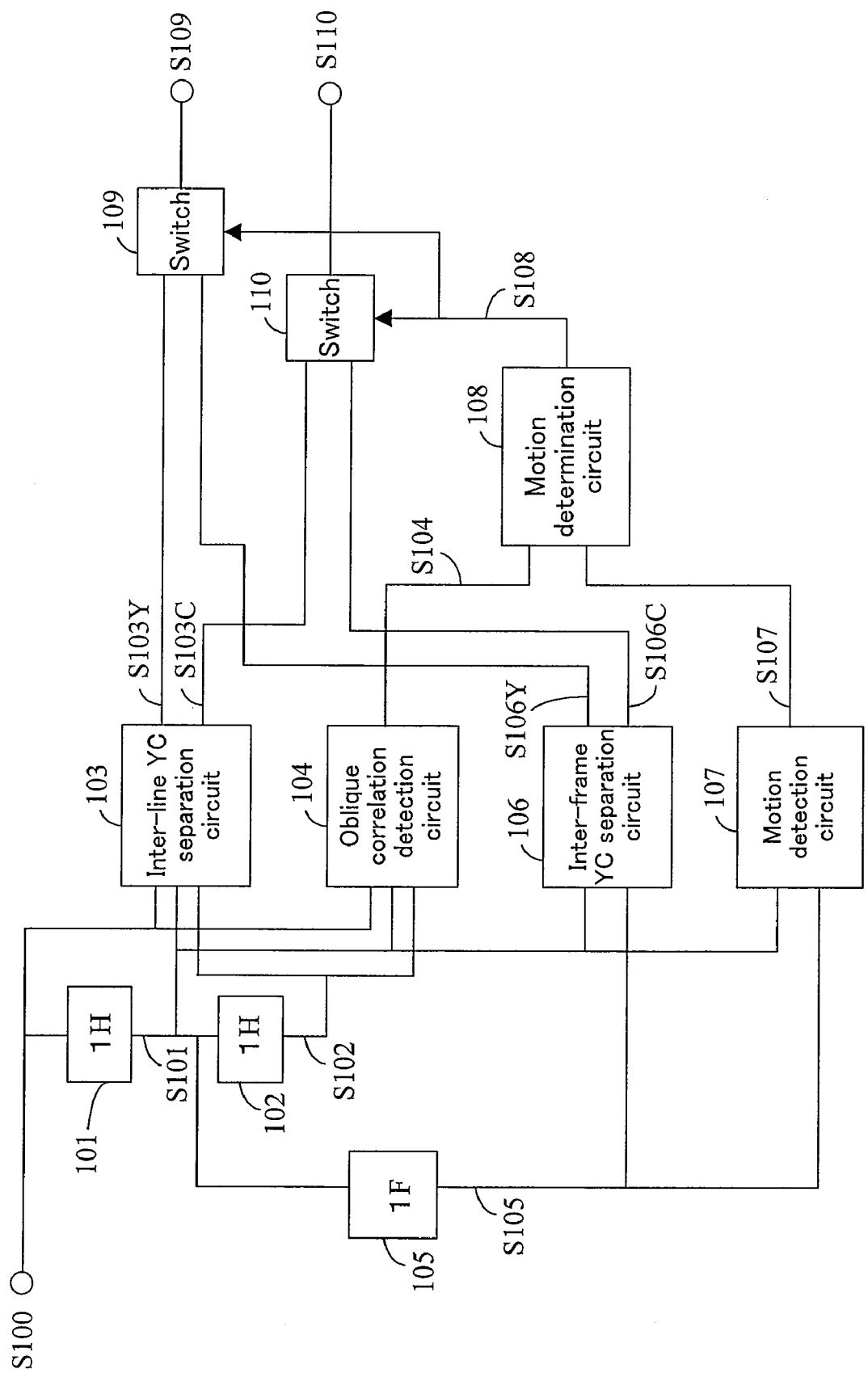
FIG. 2 is a block diagram showing the internal configuration of a Y/C separation device shown in FIG. 1.

FIG. 2 shows the internal configuration of the Y/C separation device 3 shown in FIG. 1. The Y/C separation device 3 includes line memories 101 and 102, a line correlation YC separation circuit 103, an oblique correlation detection circuit 104, a frame memory 105, a frame correlation YC separation circuit 106, a motion detection circuit 107, a motion determination circuit 108 and switch circuits 109 and 110.

The line memory 101 delays the composite video signal S100 output from the AV switch 2 (see FIG. 1) by one horizontal period, and outputs the results as a composite video signal S101. The line memory 102 delays the signal S101 output from the line memory 101 by one horizontal period, and outputs the results as a composite video signal S102.

The line correlation YC separation circuit 103 extracts a luminance signal S103Y and a chrominance signal S103C based on the correlation among the composite video signals S100, S101 and S102 (three-line correlation).

The oblique correlation detection circuit 104 detects a correlation in an oblique direction (oblique correlation) among luminance signal components of the composite video signals, and outputs a signal S104 corresponding to the detected oblique correlation.

The frame memory 105 delays the composite video signal S101 output from the line memory 101 by one frame period, and outputs the results as a composite video signal S105.

The frame correlation YC separation circuit 106 extracts a luminance signal S106Y and a chrominance signal S106C using the frame difference and frame addition between the one-frame separated video signals S101 and S105.

The motion detection circuit 107 detects the motion amount of each sample of the video signal from the difference between the one-frame separated video signals S101 and S105, and outputs a signal S107 corresponding to the detected motion amount.

The motion determination circuit 108 determines the presence/absence of a motion in the composite video signal based on the signal S104 output from the oblique correlation detection circuit 104 and the signal S107 output from the motion detection circuit 107, and outputs a determination signal S108 corresponding to the determination results.

The switch circuit 109 outputs either the luminance signal S103Y output from the line correlation YC separation circuit 103 or the luminance signal S106Y output from the frame correlation YC separation circuit 106, as the luminance signal S109, according to the determination signal S108 output from the motion determination circuit 108. The switch circuit 110 outputs either the chrominance signal S103C output from the line correlation YC separation circuit 103 or the chrominance signal S106C output from the frame correlation YC separation circuit 106, as the chrominance signal S110, according to the determination signal S108 output from the motion determination circuit 108.

Internal Configuration of Oblique Correlation Detection Circuit 104

Figure 3:
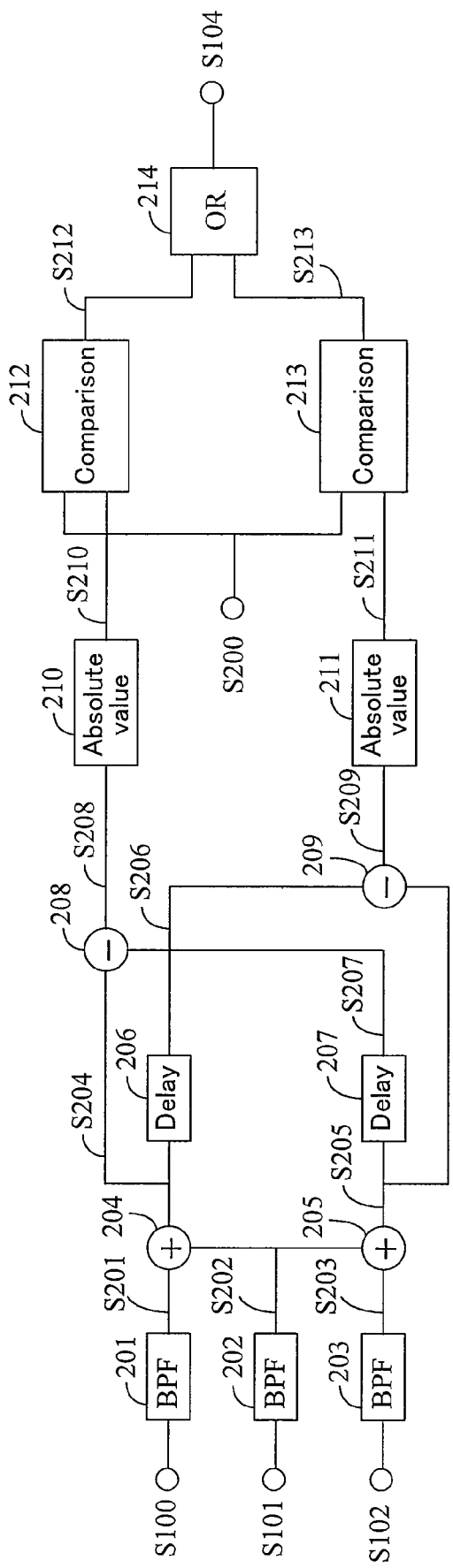
FIG. 3 is a block diagram showing the internal configuration of an oblique correlation detection circuit shown in FIG. 2.

FIG. 3 shows the internal configuration of the oblique correlation detection circuit 104 shown in FIG. 2. The oblique correlation detection circuit 104 includes band-pass filters 201, 202 and 203, adders 204 and 205, delay circuits 206 and 207, subtractors 208 and 209, absolute value circuits 210 and 211, comparators 212 and 213 and an OR circuit 214.

The band-pass filters 201, 202 and 203 are band-pass filters of which the center frequency is 3.58 MHz that is a chrominance subcarrier frequency. The delay circuits 206 and 207 respectively delay signals S204 and S205 output from the adders 204 and 205 at a clock frequency four times as high as the chrominance subcarrier frequency. The subtractor 208 subtracts an output S207 of the delay circuit 207 from the output S204 of the adder 204. The subtractor 209 subtracts an output S206 of the delay circuit 206 from the output S205 of the adder 205. The absolute value circuit 210 calculates the absolute value of an output S208 of the subtractor 208 and outputs the results as a signal S210. The absolute value circuit 211 calculates the absolute value of an output S209 of the subtractor 209 and outputs the results as a signal S211. The comparators 212 and 213 respectively compare the signals S210 and S211 output from the absolute value circuits 210 and 211 with a reference value S200, and output signals S212 and S213 corresponding to the comparison results. The OR circuit 214 outputs the logical OR value of the outputs S212 and S213 of the comparators 212 and 213.

Operation of Y/C Separation Device 3

The operation of the Y/C separation device 3 configured as described above will be described.

The input composite video signal S100 is given to the line memories 101 and 102, to obtain the one-line delayed composite video signal S101 and the one more line (two-line) delayed composite video signal S102.

The line correlation YC separation circuit 103 band-limits the composite video signals S100, S101 and S102 over three lines with respective band-pass filters having a pass frequency band of 3.58 MHz as the center, and then takes the majority or the median for determination of the correlation in chrominance signal among the three lines, to thereby provide the three-line correlation chrominance signal S103C and the three-line correlation luminance signal S103Y.

The one-line delayed composite video signal S101 is input into the frame memory 105 to provide the one-frame preceding composite video signal S105. The frame correlation YC separation circuit 106 performs addition and subtraction for the composite video signals S101 and S105 having a difference of one frame period, to provide the frame correlation luminance signal S106Y and the frame correlation chrominance signal S106C.

The composite video signals S100, S101 and S102 over three lines are also given to the oblique correlation detection circuit 104. The oblique correlation detection circuit 104 band-limits the composite video signals S100, S101 and S102 with the respective band-pass filters having a pass frequency band of 3.58 MHz as the center, to provide the signals S201, S202 and S203 band-limited to around 3.58 MHz as the center. The phase of a color is inverted 180 degrees between lines. Therefore, by adding the band-limited signal S202 in the center line and the band-limited signal S201 different by one line together with the adder 204, the chrominance signal components of these signals are cancelled each other, providing the band-limited luminance component signal S204. Likewise, by adding the band-limited signal S202 in the center line and the band-limited signal S203 different by one line together with the adder 205, the chrominance signal components of these signals are cancelled each other, providing the band-limited luminance component signal S205. The delay circuits 206 and 207 respectively delay the band-limited luminance component signals S204 and S205 every clock, to provide the luminance component signals S206 and S207. The subtractor 208 calculates the difference between the band-limited luminance component signal S204 and the delayed luminance component signal S207, to obtain the correlation value S208 of luminance signal components in a first oblique direction from the difference in obliquely positioned sample points. The absolute value circuit 210 calculates the absolute value of the first correlation value S208, to provide the first oblique-direction difference value S210. The comparator 212 compares the first oblique-direction difference value S210 with the oblique component determination level S200. If the difference value S210 is smaller than the oblique component determination level S200, the comparator 212 determines that there is an oblique-direction correlation, and outputs the first oblique correlation signal S212 indicating that there is a correlation. If the difference value S210 is greater than the oblique component determination level S200, the comparator 212 determines that there is no oblique-direction correlation, and outputs the first oblique correlation signal S212 indicating that there is no correlation. Likewise, to detect a component reverse in direction to the oblique component described above, the subtractor 209 calculates the difference between the band-limited luminance component signal S205 and the delayed luminance component signal S206, to obtain the correlation value S209 of luminance signal components in a second oblique direction from the difference in obliquely positioned sample points. The absolute value circuit 211 calculates the absolute value of the second correlation value S209, to provide the second oblique-direction difference value S211. The comparator 213 compares the second oblique-direction difference value S211 with the oblique component determination level S200. If the difference value S211 is smaller than the oblique component determination level S200, the comparator 213 determines that there is an oblique-direction correlation, and outputs the second oblique correlation signal S213 indicating that there is a correlation. If the difference value S211 is greater than the oblique component determination level S200, the comparator 213 determines that there is no oblique-direction correlation, and outputs the second oblique correlation signal S213 indicating that there is no correlation.

The motion detection circuit 107 detects the motion amount based on the composite video signals S101 and S105 having a difference of one frame period, and outputs the motion signal S107 corresponding to the detected motion amount. The motion determination circuit 108 compares the motion signal S107 with a predetermined threshold according to the oblique correlation detection signal S104, and outputs the determination signal S108 corresponding to the comparison results.

Figure 4:
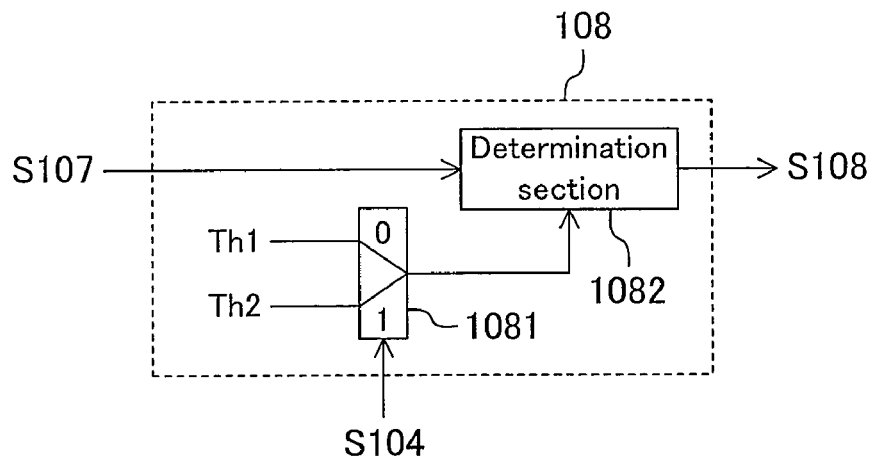
FIG. 4 is a block diagram showing an example of the internal configuration of a motion determination circuit shown in FIG. 2.
Figure 5:
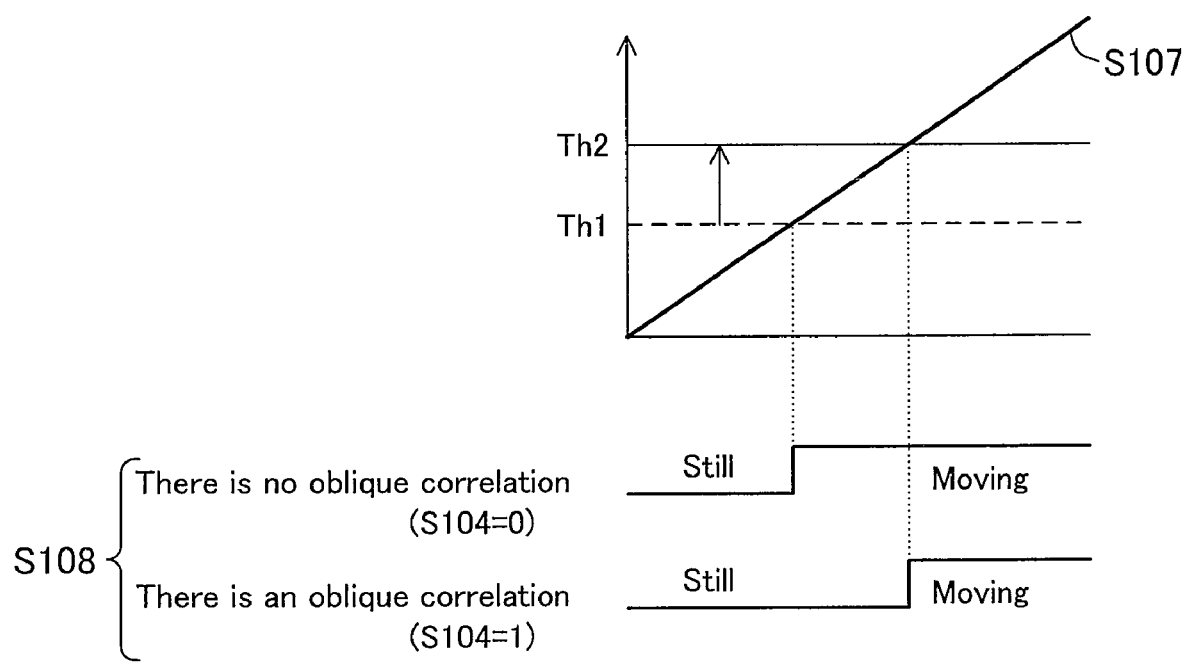
FIG. 5 is a view illustrating the motion determination performed by the motion determination circuit shown in FIG. 4.

FIG. 4 shows an example of the internal configuration of the motion determination circuit 108, which includes a selector 1081 and a determination section 1082. The selector 1081 supplies a threshold Th1 or Th2 (Th1<Th2) selectively according to the signal S104 output from the oblique correlation detection circuit 104. In the illustrated example, assume that the oblique correlation detection circuit 104 gives the signal S104 of value "1" to the selector 1081 if it determines that "there is an oblique correlation", and gives the signal S104 of value "0" to the selector 1081 if it determines that "there is no oblique correlation". The selector 1081 supplies the threshold Th1 to the determination section 1082 if the value of the signal S104 is "0", and supplies the threshold Th2 if the value is "1". If the signal S107 from the motion detection circuit 107 is greater than the threshold supplied from the selector 1081, the determination section 1082 determines that "there is a motion (moving image)" and outputs the determination signal S108 of value "1". On the contrary, if the signal S107 is smaller than the threshold supplied from the selector 1081, the determination section 1082 determines that "there is no motion (still image)" and outputs the determination signal S108 of value "0". In this way, as shown in FIG. 5, when "there is an oblique correlation", the motion determination circuit 108 widens the range (range of the level of the signal S107) within which it is determined that "there is no motion (still image)" by raising the threshold (Th1→Th2) for determination of the presence/absence of a motion.

If the value of the determination signal S108 output from the motion determination circuit 108 is "1" (that is, when it is determined that "there is a motion (moving image)"), the switch circuit 109 outputs the luminance signal S103Y received from the line correlation YC separation circuit 103 as the luminance signal S109, and the switch circuit 110 outputs the chrominance signal S103C received from the line correlation YC separation circuit 103 as the chrominance signal S109. If the value of the determination signal S108 output from the motion determination circuit 108 is "0" (that is, when it is determined that "there is no motion (still image)"), the switch circuit 109 outputs the luminance signal S106Y received from the frame correlation YC separation circuit 106 as the luminance signal S109, and the switch circuit 110 outputs the chrominance signal S106C received from the frame correlation YC separation circuit 106 as the chrominance signal S110.

Figure 6:
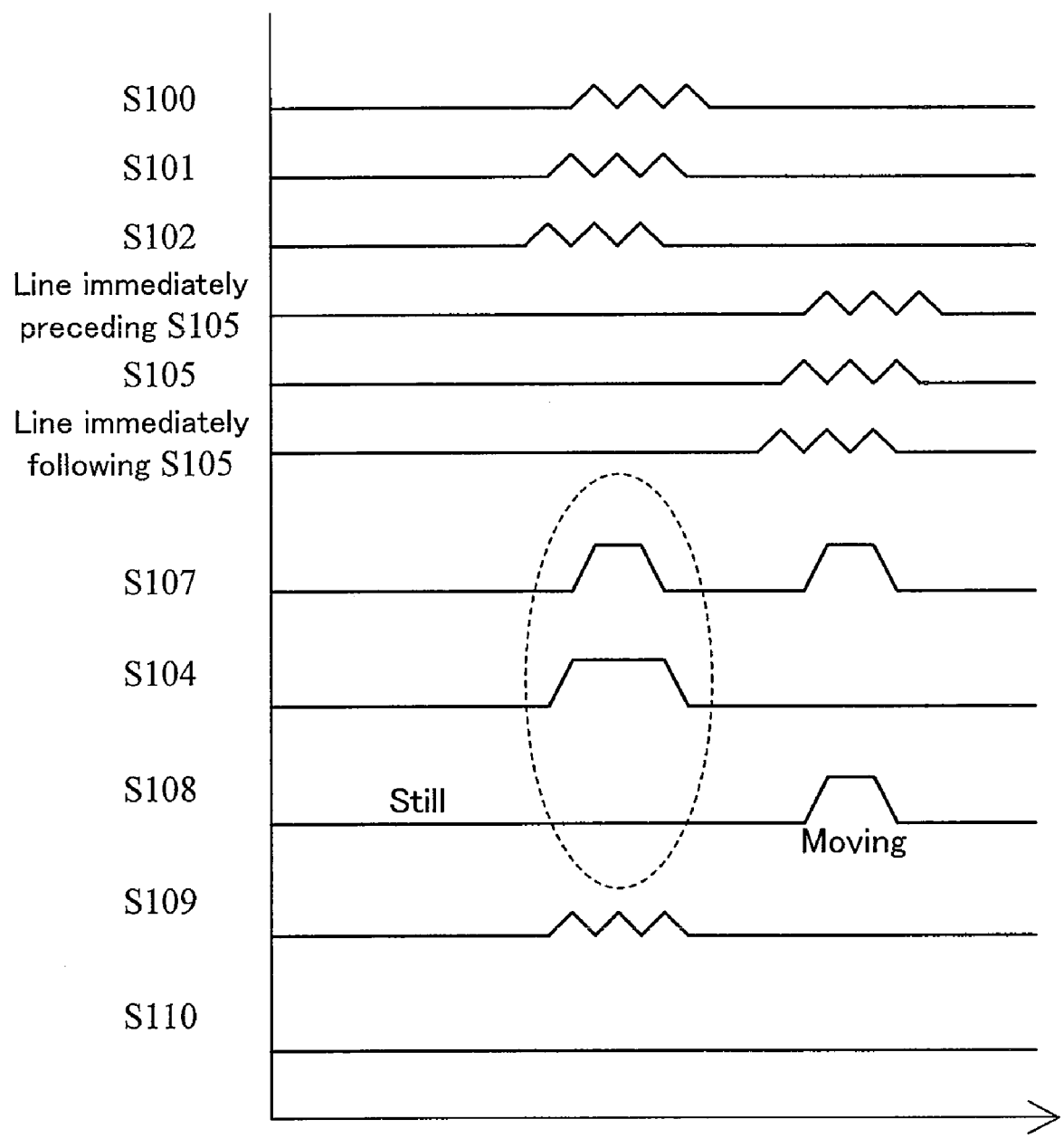
FIG. 6 is a waveform chart illustrating the operation performed when an oblique line is input into the YC separation device shown in FIG. 2.

FIG. 6 is a waveform chart of the relevant signals observed when an oblique line is input. The composite video signals S100, S101 and S102, which include the oblique line, are low in inter-line correlation. Therefore, if inter-line YC separation is performed for these signals, computation errors tend to occur and thus cross-color will often occur. When the composite video signal S101 and the one-frame preceding composite video signal S105 shift as shown in FIG. 6, the motion detection circuit 107 outputs the motion signal S107 as illustrated. The oblique correlation detection circuit 104 detects oblique components from the current-frame composite video signals S100, S101 and S102, and outputs the signal S104 indicating that "there is an oblique correlation" during the period for which oblique components are being detected. As described above, the motion determination circuit 108 raises the threshold (Th1→Th2) for determination of the presence/absence of a motion when "there is an oblique correlation" (that is, when the value of the signal S104 is "1"), to widen the range within which it is determined that "there is no motion (still image)". Accordingly, the motion determination signal S108 indicates that "there is no motion (still image)" during the period for which oblique components are being detected. In response to this signal, the switch circuit 109 outputs the luminance signal S106Y received from the frame correlation YC separation circuit 106 as the luminance signal S109, and the switch circuit 110 outputs the chrominance signal S106C received from the frame correlation YC separation circuit 106 as the chrominance signal S110. In this way, when an oblique component is input, the inter-frame YC separation is selected, so that cross-color can be reduced.

Effect

As described above, in Embodiment 1, the oblique correlation detection circuit 104 detects a oblique-direction correlation of luminance signal components from the video signals over three lines of the input composite video signal. According to the detection results from the oblique correlation detection circuit 104, the motion determination circuit 108 performs motion determination for the output signal S107 of the motion detection circuit 107 in favor of still images (raises the threshold for determination of the presence/absence of a motion when the detection results indicate that there is an oblique correlation). Accordingly, even in the event that oblique-direction luminance signal components contained in the composite vide signals S100, S101 and S102 fail to be correctly separated with the line correlation YC separation circuit 103 and leak to the line correlation output chrominance signal S103, occurrence of cross-color can be minimized in the output chrominance signal S110 because the determination is made in favor of the frame correlation YC separation when an oblique line is input, and thus the image quality can be improved. In addition, erroneous detection is less likely to occur in the motion detection results when an oblique component is input, and thus the motion detection precision can be improved.

Alterations

In this embodiment, a TV receiver was used as an example of the equipment (video signal processing apparatus and video display apparatus) incorporating the Y/C separation device 3. Alternatively, a liquid crystal TV set, a plasma display TV set, an organic EL TV set, a video capture board, a personal computer, a videocassette recorder and the like may be used.

The switch circuits 109 and 110 simply switches between the inter-line computation results (output of the line correlation YC separation circuit 103) and the inter-frame computation results (output of the frame correlation YC separation circuit 106). Alternatively, the inter-line computation results and the inter-frame computation results may be weighted, to change the proportion for synthesis or add these results at a changed signal ratio.

Figure 7:
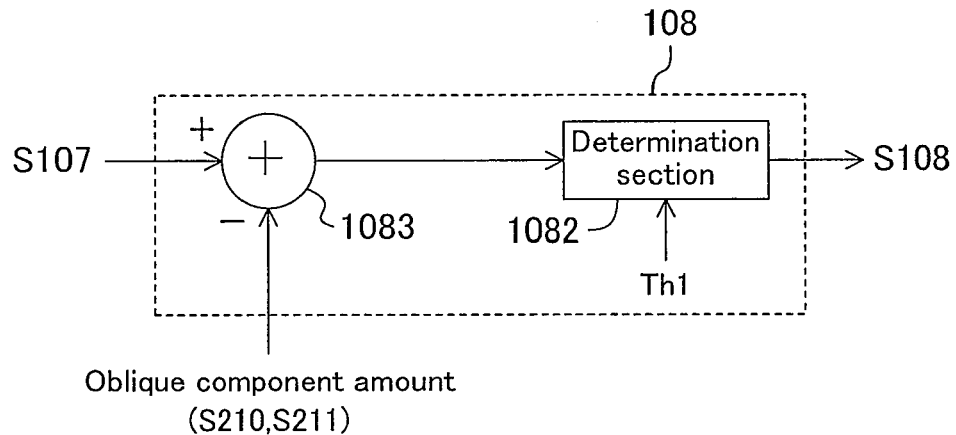
FIG. 7 is a block diagram showing another example of the internal configuration of the motion determination circuit shown in FIG. 2.

In place of the motion determination circuit 108 having the internal configuration shown in FIG. 4, a motion determination circuit 108 having an internal configuration shown in FIG. 7 may be adopted. In the motion determination circuit 108 shown in FIG. 4, the determination of the presence/absence of a motion was made in favor of still images by raising the threshold when the oblique correlation detection circuit 104 determines that there is an oblique correlation. In the motion determination circuit 108 shown in FIG. 7, an adder 1083 attenuates the motion amount S107 detected by the motion detection circuit 107 according to the oblique component amounts S210 and S211 detected by the oblique correlation detection circuit 104. The determination section 1082 compares the resultant amount with a fixed threshold Th1, to determine the presence/absence of a motion.

Figure 8:
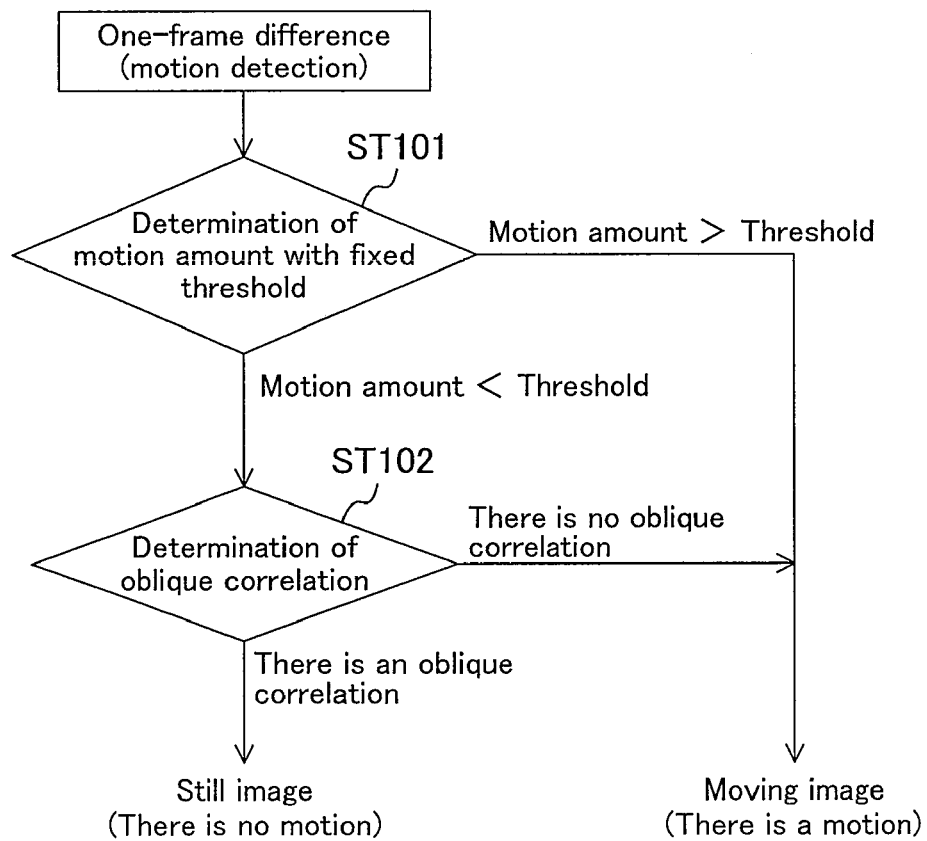
FIG. 8 is a flowchart showing the flow of determination processing performed by yet another example of the motion determination circuit shown in FIG. 2.

The motion determination circuit 108 may otherwise determine the presence/absence of a motion according to the flow shown in FIG. 8. The determination flow shown in FIG. 8 first compares the motion amount S107 detected by the motion detection circuit 107 with a fixed threshold Th1 (ST101). If the motion amount S107 is greater than the threshold Th1, the motion determination circuit 108 determines that "there is a motion (moving image)" and outputs the determination signal S108 corresponding to this determination. If the motion amount S107 is smaller than the threshold Th1, the motion determination circuit 108 determines the presence/absence of a motion according to the presence/absence of an oblique correlation (ST102). If the output of the oblique correlation detection circuit 104 indicated that "there is no oblique correlation", the motion determination circuit 108 determines that "there is a motion (moving image)" and outputs the determination signal S108 corresponding to this determination. If the output of the oblique correlation detection circuit 104 indicated that "there is an oblique correlation", the motion determination circuit 108 determines that "there is no motion (still image)" and outputs the determination signal S108 corresponding to this determination.

Embodiment 2

Internal Configuration of Y/C Separation Device 3

Figure 9:
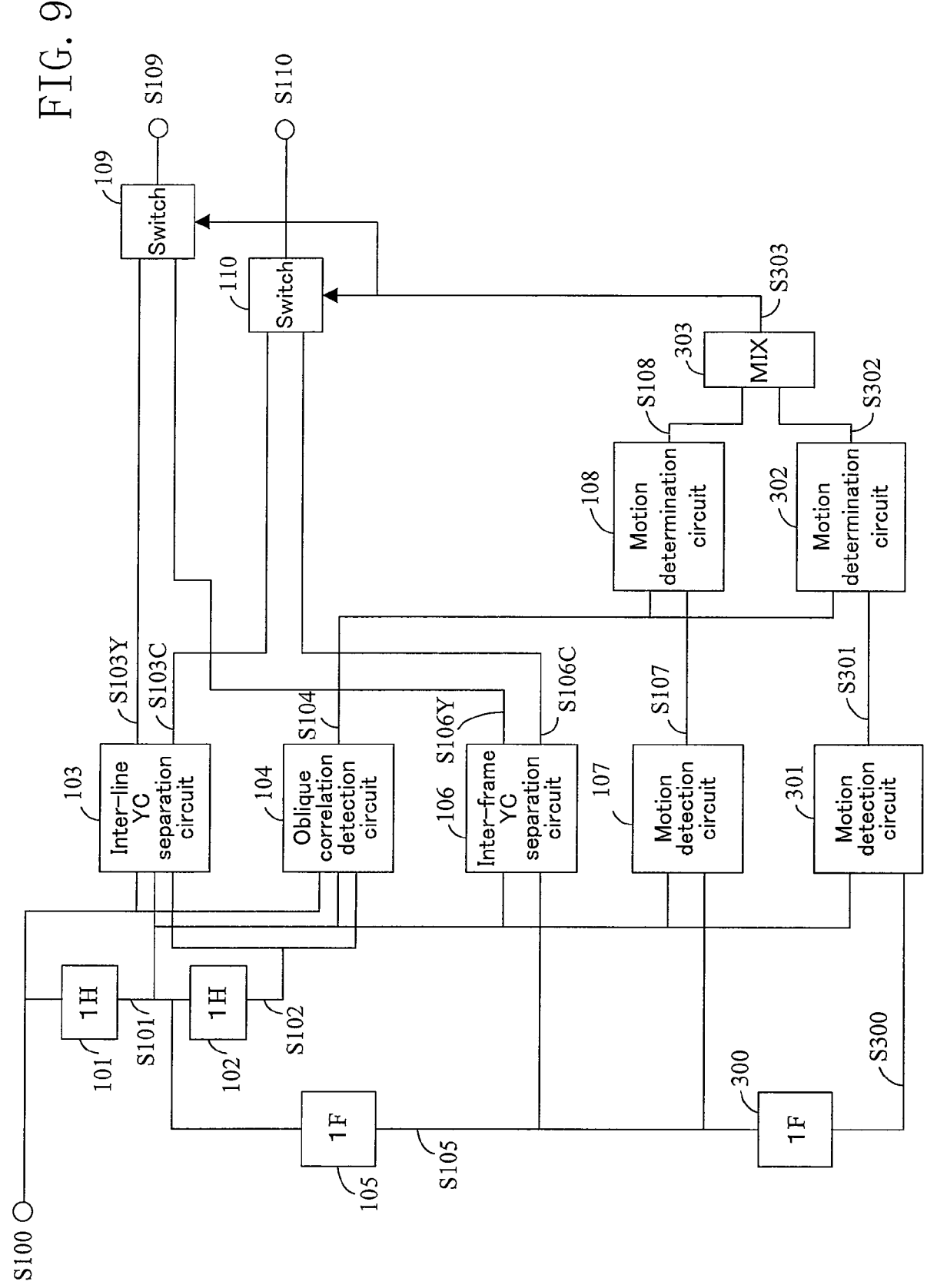
FIG. 9 is a block diagram showing the internal configuration of a Y/C separation device in Embodiment 2.

FIG. 9 shows the internal configuration of the Y/C separation device 3 in Embodiment 2. The Y/C separation device 3 includes, in addition to the components shown in FIG. 1, a frame memory 300, a motion detection circuit 301, a motion determination circuit 302 and a synthesis circuit 303. The frame memory 300 delays the composite video signal S105 output from the frame memory 105 by one frame period, and outputs the results as a composite video signal S300. The motion detection circuit 301 detects the motion amount of each sample of the video signal from the difference between the two-frame separated video signals S101 and S300, and outputs a signal S301 corresponding to the detected motion amount. Like the motion determination circuit 108, the motion determination circuit 302 determines the presence/absence of a motion in the composite video signal based on the signal S104 output from the oblique correlation detection circuit 104 and the signal S301 output from the motion detection circuit 301, and outputs a determination signal S302 corresponding to the determination results. The synthesis circuit 303 combines the determination signal S108 from the motion determination circuit 108 and the determination signal S302 from the motion determination circuit 302 (executes OR of these signals), and outputs the results as a determination signal S303. The switch circuit 109 outputs either the luminance signal S103Y output from the line correlation YC separation circuit 103 or the luminance signal S106Y output from the frame correlation YC separation circuit 106, as the luminance signal S109, according to the determination signal S303 output from the synthesis circuit 303. The switch circuit 110 outputs either the chrominance signal S103C output from the line correlation YC separation circuit 103 or the chrominance signal S106C output from the frame correlation YC separation circuit 106, as the chrominance signal S110, according to the determination signal S303 output from the synthesis circuit 303.

Operation of Y/C Separation Device 3

The operation of the Y/C separation device 3 configured as described above will be described.

Figure 10:
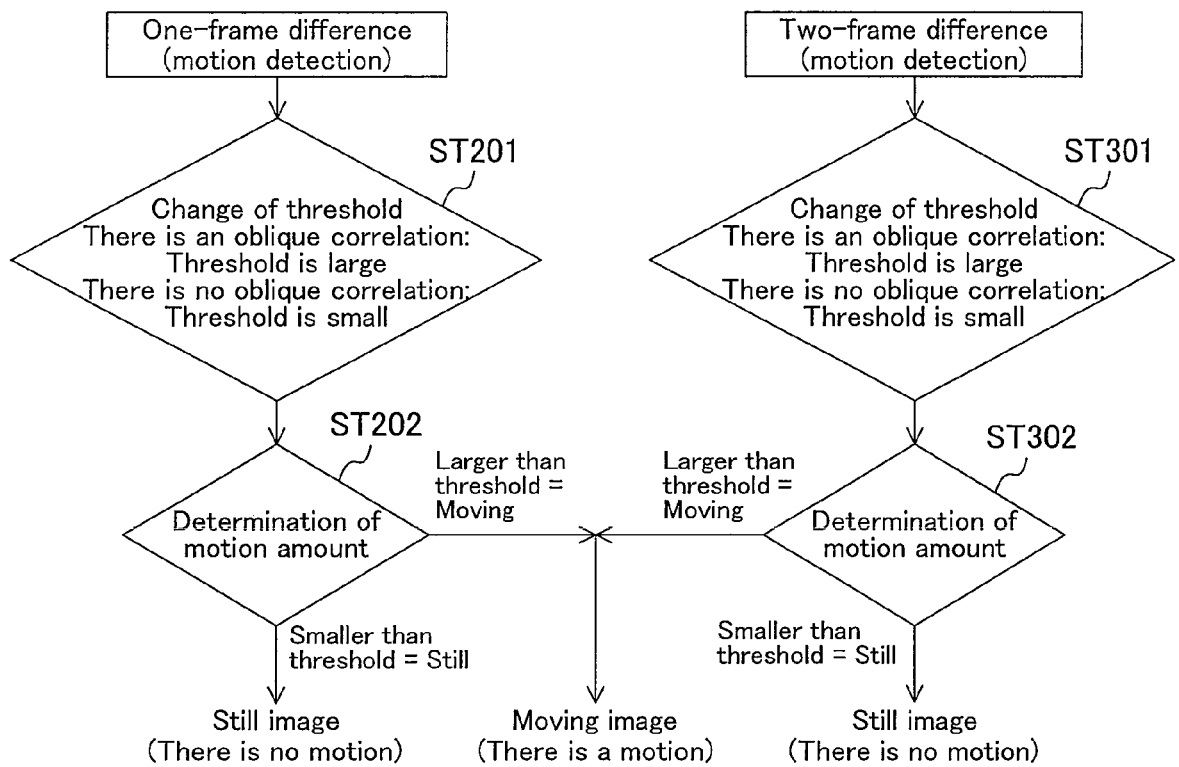
FIG. 10 is a flowchart showing the flow of determination processing performed by an example of a motion determination circuit shown in FIG. 9.

As in Embodiment 1, the motion detection circuit 107 detects a motion amount based on the composite video signals S101 and S105 having a difference of one frame period therebetween, and outputs the motion signal S107 corresponding to the detected motion amount. The motion determination circuit 108 compares the motion signal S107 with a predetermined threshold according to the oblique correlation detection signal S104, and outputs the determination signal S108 corresponding to the comparison results. Assume that the motion determination circuit 108 has the internal configuration shown in FIG. 4. As shown in FIG. 10, the motion determination circuit 108 sets the threshold for motion determination at a large value if the oblique correlation detection circuit 104 determines that there is an oblique correlation, and sets the threshold at a small value if it determines that there is no oblique correlation (ST201). The motion determination circuit 108 then compares the motion amount S107 with the set threshold, and determines that the current signal represents a moving image if the motion amount S107 is greater than the threshold, and determines that the current signal represents a still image if the motion amount S107 is smaller than the threshold (ST202). In this way, the motion determination circuit 108 raises the threshold for motion determination when an oblique correlation has been detected, to thereby make the motion determination result signal S108 in favor of still images.

The motion detection circuit 301 detects the motion amount based on the composite video signals S101 and S300 having a difference of two frame periods therebetween, and outputs the motion signal S301 corresponding to the detected motion amount. The motion determination circuit 302 compares the motion signal S301 with a predetermined threshold according to the oblique correlation detection signal S104, and outputs the determination signal S302 corresponding to the comparison results. Assume that the motion determination circuit 302 has the internal configuration shown in FIG. 4. As shown in FIG. 10, the motion determination circuit 302 sets the threshold for motion determination at a large value if the oblique correlation detection circuit 104 determines that there is a correlation, and sets the threshold at a small value if it determines that there is no correlation (ST301). The motion determination circuit 302 then compares the motion amount S301 with the set threshold, and determines that the current signal represents a moving image if the motion amount S301 is greater than the threshold, and determines that the current signal represents a still image if the motion amount S301 is smaller than the threshold (ST302). In this way, the motion determination circuit 302 raises the threshold for motion determination when an oblique correlation has been detected, so that the motion determination result signal S302 represents determination in favor of still images.

The synthesis circuit 303 combines the motion determination signals S108 and S302 together, and the combined signal is given to the switch circuits 109 and 110 as the determination signal S303. The switch circuit 109 switches between the inter-line computed luminance signal S103Y and the inter-frame computed luminance signal S106Y according to the determination signal S303. The switch circuit 110 switches between the inter-line computed chrominance signal S103C and the inter-frame computed chrominance signal S106C according to the determination signal S303.

Effect

As described above, in Embodiment 2, the oblique correlation detection circuit 104 detects the oblique-direction correlation of luminance signal components from the composite video signals S100, S101 and S102 over three lines of the input composite video signal. According to the detection results from the oblique correlation detection circuit 104, the one-frame motion determination circuit 108 performs motion determination for the output signal S107 of the one-frame motion detection circuit 107 in favor of still images, and also the two-frame motion determination circuit 302 performs motion determination for the output signal S301 of the two-frame motion detection circuit 301 in favor of still images. Accordingly, even in the event that oblique-direction luminance signal components are contained in the signals S100, S101 and S102 input into the three-line correlation YC separation circuit 103 and fail to be correctly separated with the three-line correlation YC separation circuit 103, leaking to the line correlation output chrominance signal S103C, occurrence of cross-color is minimized in the output chrominance signal S110 because the determination is made in favor of the frame correlation YC separation when an oblique line is input, and thus the image quality can be improved.

In addition, the two-frame motion detection results are corrected in favor of still images according to the oblique correlation detection results. Therefore, in addition to improving the precision of the motion detection of the luminance signal using the one-frame difference, the precision of the motion detection over the entire band of the video signal can be improved using the two-frame difference.

Alterations

As described in the alterations to Embodiment 1, the motion determination circuits 108 and 302 may have the internal configuration shown in FIG. 7 in place of that shown in FIG. 4.

Figure 11:
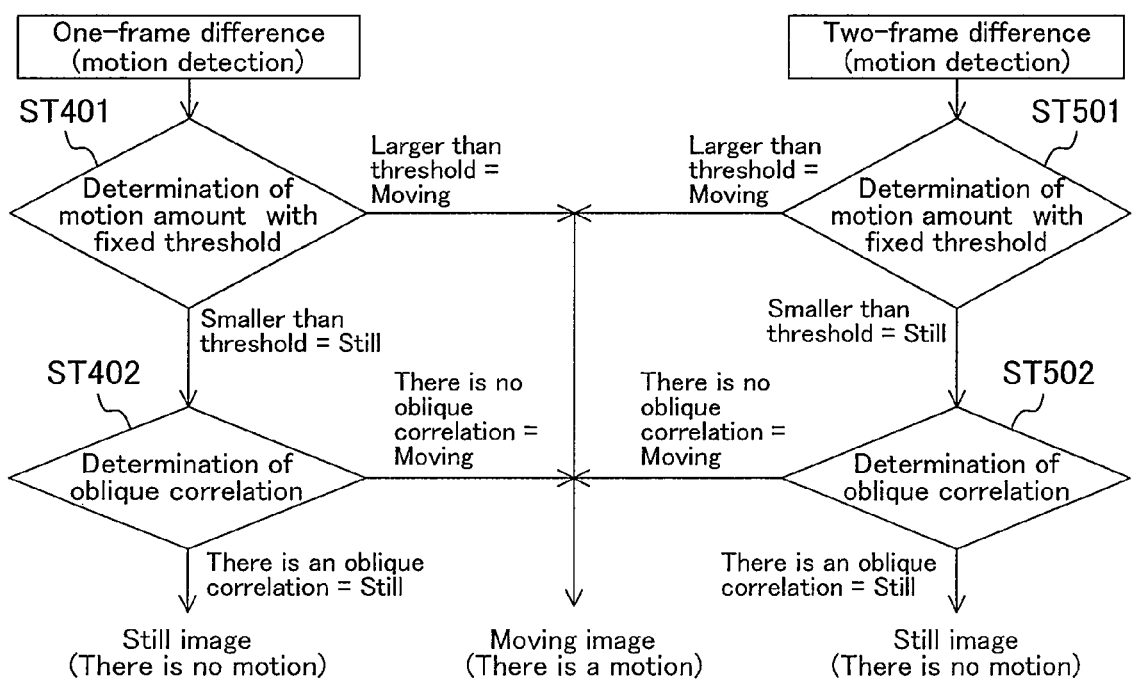
FIG. 11 is a flowchart showing the flow of determination processing performed by another example of the motion determination circuit shown in FIG. 9.

Alternatively, the motion determination circuits 108 and 302 may determine the presence/absence of a motion according to the flow shown in FIG. 11. In the determination flow shown in FIG. 11, the motion amounts S107 and S301 respectively detected by the motion detection circuits 107 and 301 are compared with a fixed threshold Th1 (ST401 and ST501). If the motion amounts S107 and S301 are greater than the threshold Th1, the determination circuits 108 and 302 determine that "there is a motion (moving image)" and respectively output the determination signals S108 and S302 corresponding to this determination. If the motion amounts S107 and S301 are smaller than the threshold Th1, the determination circuits 108 and 302 determine the presence/absence of a motion according to the presence/absence of an oblique correlation (ST402 and ST502). If the oblique correlation detection circuit 104 determines that "there is no oblique correlation", the motion determination circuits 108 and 302 determine that "there is a motion (moving image)" and output the determination signals S108 and S302 corresponding to this determination. If the oblique correlation detection circuit 104 determines that "there is an oblique correlation", the motion determination circuits 108 and 302 determine that "there is no motion (still image)" and output the determination signals S108 and S302 corresponding to this determination.

Embodiment 3

Internal Configuration of Y/C Separation Device 3

Figure 12:
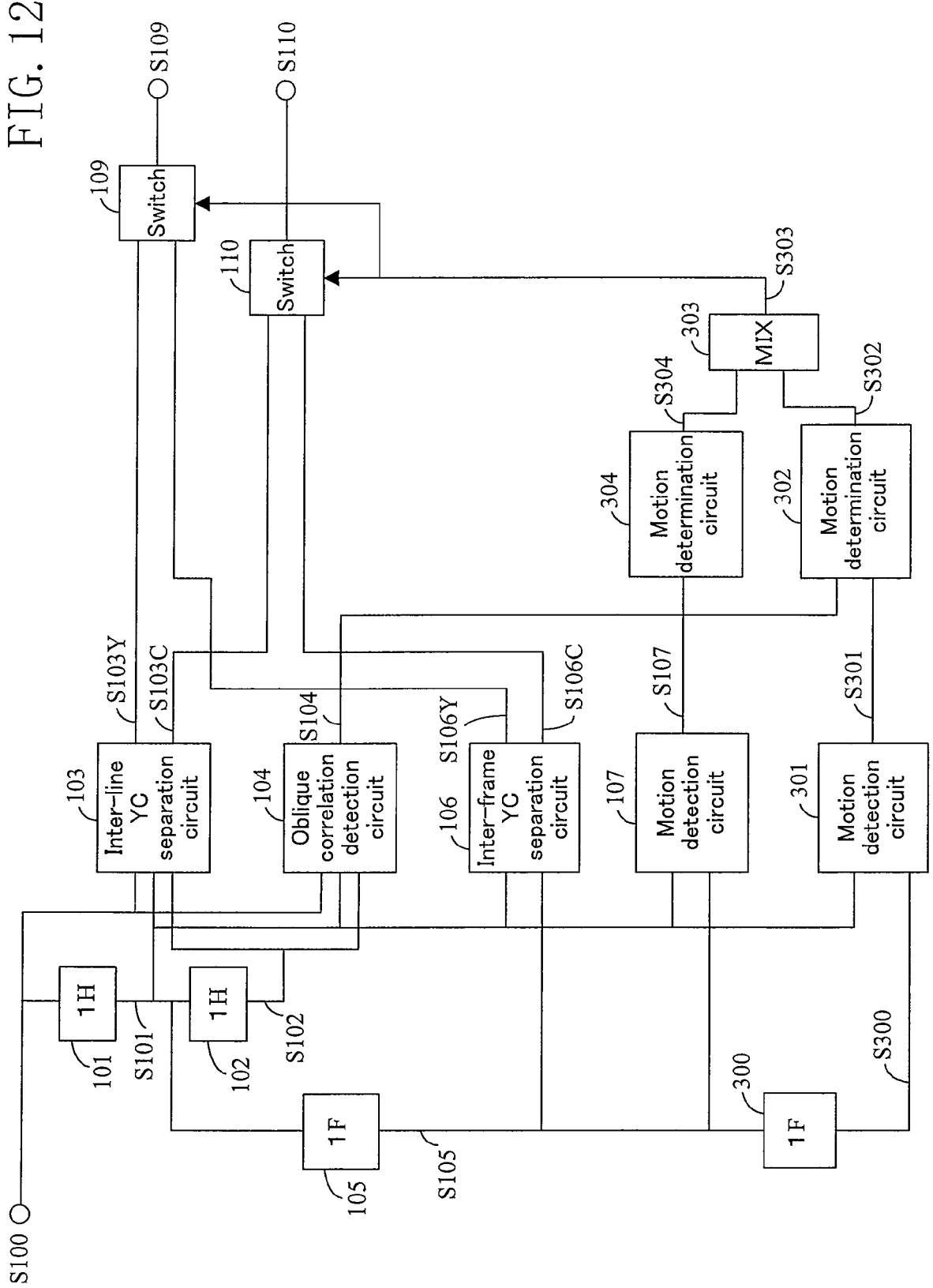
FIG. 12 is a block diagram showing the internal configuration of a Y/C separation device in Embodiment 3.

FIG. 12 shows the internal configuration of the Y/C separation device 3 in Embodiment 3. The Y/C separation device 3 in this embodiment is the same as the Y/C separation device 3 shown in FIG. 9 except that a motion determination circuit 304 is provided in this embodiment in place of the motion determination circuit 108 shown in FIG. 9. The motion determination circuit 304 compares the motion amount S107 detected by the motion detection circuit 107 with a fixed threshold and outputs a determination signal S304 corresponding to the comparison results. The synthesis circuit 303 combines the determination signal S304 output from the motion determination circuit 304 and the determination signal S302 output from the motion determination circuit 302 together (executes OR of these signals), and outputs the results as the determination signal S303.

Operation of Y/C Separation Device 3

The operation of the Y/C separation device 3 configured as described above will be described.

The one-frame delayed composite video signal S105 is further delayed with the frame memory 300 by one frame, to provide the composite video signal S300. The two-frame motion detection circuit 301 detects a motion amount from the composite video signals S101 and S300 having a difference of two frame periods therebetween, and outputs the two-frame motion signal S301. The two-frame motion determination circuit 302 attenuates or corrects the motion signal S301 according to the oblique correlation detection signal S104. If an oblique component is detected, the motion amount is attenuated, or the threshold for motion determination is raised, to thereby give the motion determination signal S302 in favor of still images. The switch circuit 109 switches between the inter-line computed luminance signal S103Y and the inter-frame computed luminance signal S106Y according to the motion determination result signal S303. The switch circuit 110 switches between the inter-line computed chrominance signal S103C and the inter-frame computed chrominance signal S106C according to the motion determination result signal S303.

Effect

In this embodiment, the oblique correlation detection circuit 104 detects an correlation in an oblique direction of luminance signal components from the video signals S100, S101 and S102 over three lines of the input composite video signal. According to the detection results from the oblique correlation detection circuit 104, the two-frame motion determination circuit 302 attenuates or corrects the output signal S301 of the two-frame motion detection circuit 301, to perform the motion determination in favor of still images. Accordingly, even in the event that oblique-direction luminance signal components are contained in the signals S100, S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved. In addition, since the two-frame motion detection results are attenuated or corrected according to the oblique correlation detection results, the precision of the motion detection over the entire band of the video signal can be improved based on the two-frame difference. This makes erroneous detection less likely to occur in the motion detection results when an oblique component is input, and thus improves the motion detection precision over the entire band of the video signal.

Embodiment 4

Internal Configuration of Y/C Separation Device 3

Figure 13:
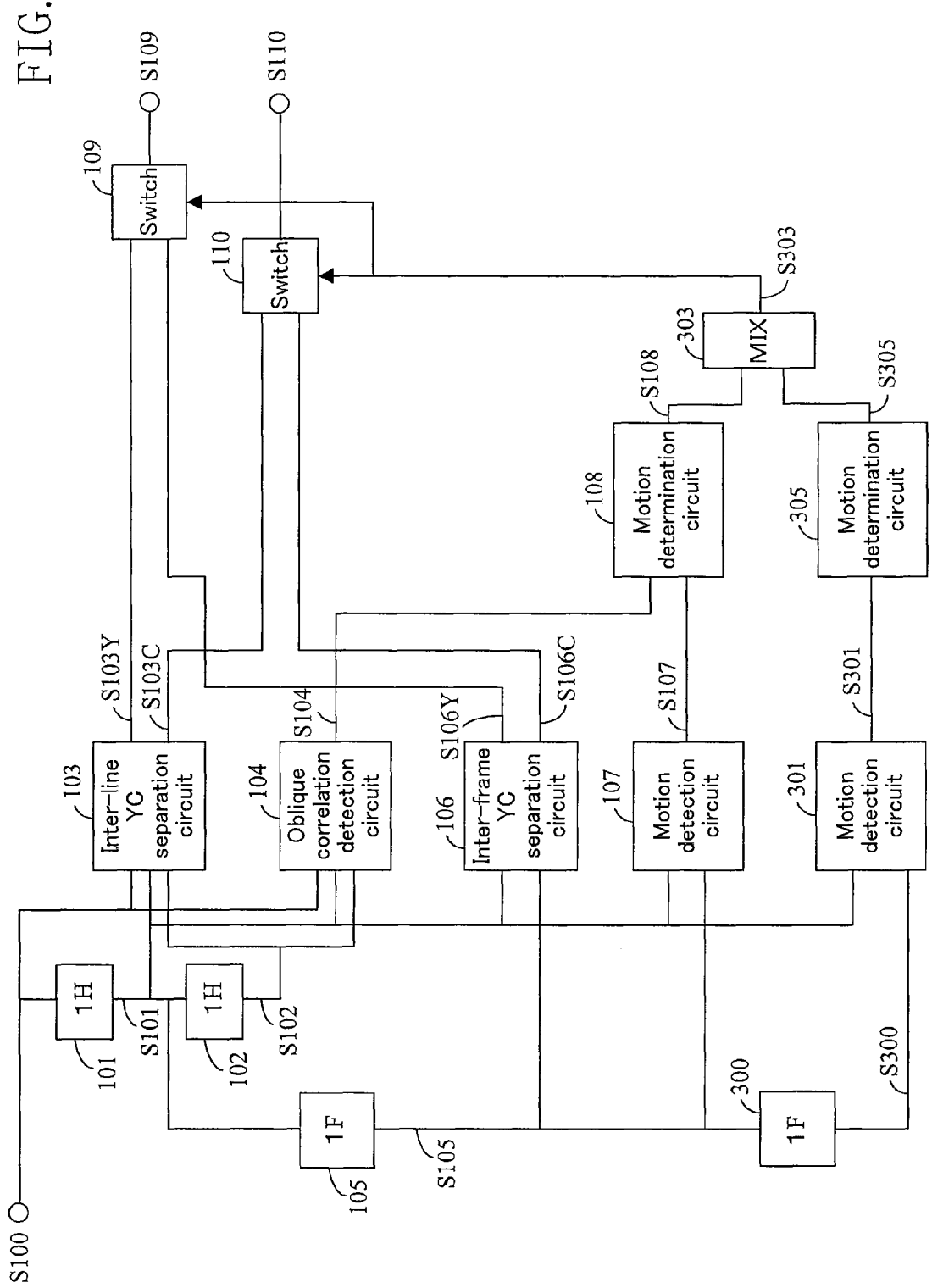
FIG. 13 is a block diagram showing the internal configuration of a Y/C separation device in Embodiment 4.

FIG. 13 shows the internal configuration of the Y/C separation device 3 in Embodiment 4. The Y/C separation device 3 in this embodiment is the same as the Y/C separation device 3 shown in FIG. 9 except that a motion determination circuit 305 is provided in this embodiment in place of the motion determination circuit 302 shown in FIG. 9. The motion detection circuit 305 compares the motion amount S301 detected by the motion detection circuit 301 with a fixed threshold and outputs a determination signal S305 corresponding to the comparison results. The synthesis circuit 303 combines the determination signal S108 output from the motion determination circuit 108 and the determination signal S305 output from the motion determination circuit 305 together (executes OR of these signals), and outputs the results as the determination signal S303.

Operation of Y/C Separation Device 3

The operation of the Y/C separation device 3 configured as described above will be described.

The composite video signal S101 is delayed with the frame memory 105 by one frame. The one-frame motion detection circuit 107 detects a motion amount from the composite video signals S101 and S105 having a difference of one frame period therebetween, and outputs the one-frame motion signal S107. The one-frame motion determination circuit 108 attenuates or corrects the motion signal S107 according to the oblique correlation detection signal S104. If an oblique component is detected, the motion amount is attenuated, or the threshold for motion determination is raised, to thereby give the motion determination result signal S108 in favor of still images. The one-frame delayed composite video signal S105 is further delayed with the frame memory 300 by one frame, to provide the composite video signal S300. The two-frame motion detection circuit 301 detects a motion amount from the composite video signals S101 and S300 having a difference of two frame periods therebetween, and outputs the two-frame motion signal S301. The synthesis circuit 303 combines the one-frame motion determination signal S108 and the two-frame motion determination signal S305 together. The switch circuit 109 switches between the inter-line computed luminance signal S103Y and the inter-frame computed luminance signal S106Y according to the motion determination result signal S303. The switch circuit 110 switches between the inter-line computed chrominance signal S103C and the inter-frame computed chrominance signal S106C according to the motion determination result signal S303.

Effect

In this embodiment, the oblique correlation detection circuit 104 detects a correlation in an oblique direction of luminance signal components from the video signals S100, S101 and S102 over three lines of the input composite video signal. According to the detection results from the oblique correlation detection circuit 104, the one-frame motion determination circuit 108 attenuates or corrects the output signal S107 of the one-frame motion detection circuit 107, to perform the motion determination in favor of still images. Accordingly, even in the event that oblique-direction luminance signal components are contained in the signals S100, S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved. In addition, since the one-frame motion detection results are attenuated or corrected according to the oblique correlation detection results, the precision of the motion detection of the luminance signal can be improved based on the one-frame difference. This makes erroneous detection less likely to occur in the motion detection results when an oblique component is input, and thus improves the motion detection precision of the luminance signal in one-frame difference.

Embodiment 5

Internal Configuration of Y/C Separation Device 3

Figure 14:
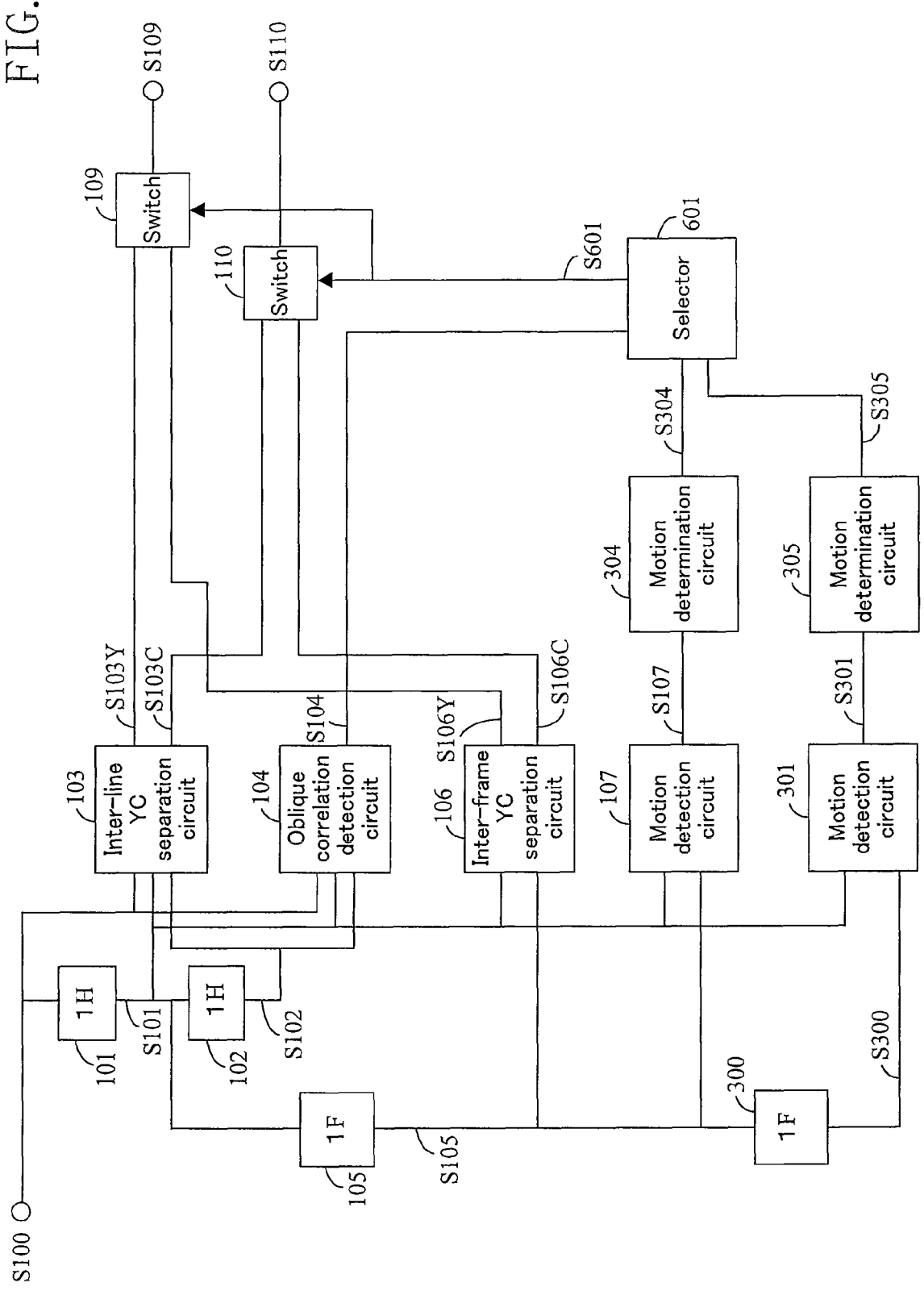
FIG. 14 is a block diagram showing the internal configuration of a Y/C separation device in Embodiment 5.

FIG. 14 shows the internal configuration of the Y/C separation device 3 in Embodiment 5. The Y/C separation device 3 in this embodiment is the same as the Y/C separation device 3 shown in FIG. 9 except that motion determination circuits 304 and 305 and a selector 601 are provided in this embodiment in place of the motion determination circuits 108 and 302 and the synthesis circuit 303 shown in FIG. 9. The motion detection circuits 304 and 305 respectively compare the motion amounts S107 and S301 detected by the motion detection circuits 107 and 301 with a fixed threshold and output determination signals S304 and S305 corresponding to the comparison results. The selector 601 outputs the determination signal S304 from the motion determination circuit 304 as a determination signal S601 to the switch circuits 109 and 110 if the signal S104 from the oblique correlation detection circuit 104 indicates that "there is an oblique correlation". If the signal S104 indicates that "there is no oblique correlation", the selector 601 combines the determination signal S304 output from the motion determination circuit 304 and the determination signal S305 output from the motion determination circuit 305 together (executes OR of these signals) and outputs the combined signal as the determination signal S601 to the switch circuits 109 and 110.

Operation of Y/C Separation Device 3

The operation of the Y/C separation device 3 configured as described above will be described.

The composite video signal S101 is delayed with the frame memory 105 by one frame. The one-frame motion detection circuit 107 detects a motion amount from the composite video signals S101 and S105 having a difference of one frame period therebetween, and outputs the one-frame motion signal S107. The one-frame delayed composite video signal S105 is further delayed with the frame memory 300 by one frame, to provide the composite video signal S300. The two-frame motion detection circuit 301 detects a motion amount from the composite video signals S101 and S300 having a difference of two frame periods therebetween, and outputs the two-frame motion signal S301. The selector 601 outputs the one-frame motion determination signal S304 as the determination signal S601 if there is an oblique correlation, and outputs a combined signal of the one-frame motion determination signal S304 and the two-frame motion determination signal S305 as the determination signal S601 if there is no oblique correlation. The switch circuit 109 switches between the inter-line computed luminance signal S103Y and the inter-frame computed luminance signal S106Y according to the motion determination signal S601. The switch circuit 110 switches between the inter-line computed chrominance signal S103C and the inter-frame computed chrominance signal S106C according to the motion determination signal S601.

Effect

As described above, in Embodiment 5, if the oblique correlation detection circuit 104 determines that there is an oblique correlation, the output signal S304 of the motion determination circuit 304 is output to the switch circuits 109 and 110 as the determination signal S601. If the oblique correlation detection circuit 104 determines that there is no oblique correlation, the determination signal S304 from the motion determination circuit 304 and the determination signal S305 from the motion determination circuit 305 are combined together, and the combined signal is output to the switch circuits 109 and 110 as the determination signal S601. With this configuration of Embodiment 5, the effect obtained by the Y/C separation devices in Embodiments 1 to 4 described above can also be obtained. That is, even in the event that oblique-direction luminance signal components are contained in the signals S100 S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved.

Embodiment 6

Internal Configuration of Y/C Separation Device 3

Figure 15:
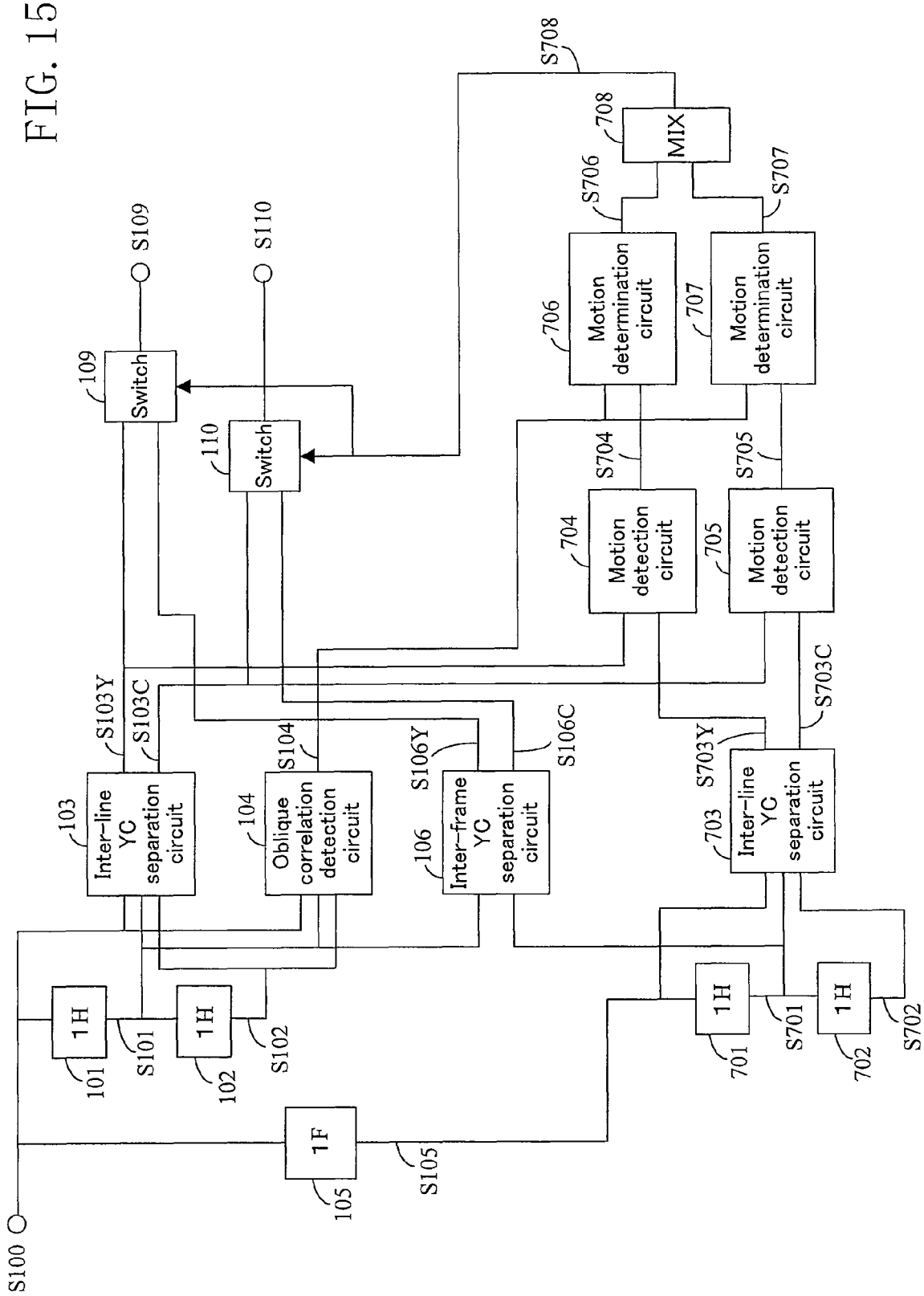
FIG. 15 is a block diagram showing the internal configuration of a Y/C separation device in Embodiment 6

FIG. 15 shows the internal configuration of the Y/C separation device 3 in Embodiment 6. The Y/C separation device 3 in this embodiment includes line memories 101, 102, 701 and 702, a frame memory 105, line correlation YC separation circuits 103 and 703, a frame correlation YC separation circuit 106, an oblique correlation detection circuit 104, motion detection circuits 704 and 705, motion determination circuits 706 and 707, a synthesis circuit 708 and switch circuits 109 and 110.

The line memory 701 delays the composite video signal S105 output from the frame memory 105 by one horizontal period, and outputs the results as a composite video signal S701. The line memory 702 delays the composite vide signal S701 output from the line memory 701 by one horizontal period, and outputs the results as a composite video signal S702.

The line correlation YC separation circuit 703 extracts a luminance signal S703Y and a chrominance signal S703C based on the correlation (three-line correlation) among the composite video signals S105, S701 and S702.

The motion detection circuit 704 detects a motion amount of each sample of the luminance signal from the difference between the one-frame separated luminance signals S103Y and S703Y, and outputs a signal S704 corresponding to the detected motion amount.

The motion determination circuit 706 determines the presence/absence of a motion in the luminance signal based on the signal S104 output from the oblique correlation detection circuit 104 and the signal S704 output from the motion detection circuit 704, and outputs a determination signal S706 corresponding to the determination results.

The motion detection circuit 705 detects a motion amount of each sample of the chrominance signal from the difference between the one-frame separated chrominance signals S103C and S703C, and outputs a signal S705 corresponding to the detected motion amount.

The motion determination circuit 707 determines the presence/absence of a motion in the chrominance signal based on the signal S104 output from the oblique correlation detection circuit 104 and the signal S705 output from the motion detection circuit 705, and outputs a determination signal S707 corresponding to the determination results.

The synthesis circuit 708 combines the determination signal S706 output from the motion determination circuit 706 and the determination signal S707 output from the motion determination circuit 707 together (executes OR of these signals), and outputs the results as a determination signal S708.

The switch circuit 109 outputs either the luminance signal S103Y output from the line correlation YC separation circuit 103 or the luminance signal S106Y output from the frame correlation YC separation circuit 106, as the luminance signal S109, according to the determination signal S708 output from the synthesis circuit 708. The switch circuit 110 outputs either the chrominance signal S103C output from the line correlation YC separation circuit 103 or the chrominance signal S106C output from the frame correlation YC separation circuit 106, as the chrominance signal S110, according to the determination signal S708 output from the synthesis circuit 708.

Operation of Y/C Separation Device 3

The operation of the Y/C separation device 3 configured as described above will be described.

The input composite video signal S100 is delayed with the line memories 101 and 102 to obtain the one-line delayed and two-line delayed composite video signals S101 and S102. The input composite video signal S100 is also delayed with the frame memory 105 by one frame, and further delayed with the line memories 701 and 702 to obtain the one-line delayed and two-line delayed composite video signals S701 and S702. The line correlation YC separation circuit 703 band-limits the composite video signals S100, S101 and S102 over three lines with respective band-pass filters having a pass frequency band of 3.58 MHz as the center, and then takes the majority or the median for determination of the correlation in chrominance signal among the three lines, to thereby provide the three-line correlation chrominance signal S703C and the three-line correlation luminance signal S703Y.

The motion detection circuit 704 detects a one-frame motion amount of the luminance signal from the luminance signals S103Y and S703Y having a difference of one frame period therebetween, and outputs the signal S704 corresponding to the detected motion amount. The motion determination circuit 706, which has substantially the same configuration and operation as those of the motion determination circuit 108 described in Embodiment 1, attenuates or corrects the motion signal S704 according to the oblique correlation detection signal S104. If an oblique component has been detected, the motion amount is attenuated or the threshold for motion determination is raised, to provide the motion determination result signal S706 in favor of still images.

The motion detection circuit 705 detects a one-frame motion amount of the chrominance signal from the chrominance signals S103C and S703C having a difference of one frame period therebetween, and outputs the signal S705 corresponding to the detected motion amount. The motion determination circuit 707, which has substantially the same configuration and operation as those of the motion determination circuit 108 described in Embodiment 1, attenuates or corrects the motion signal S705 according to the oblique correlation detection signal S104. If an oblique component has been detected, the motion amount is attenuated or the threshold for motion determination is raised, to provide the motion determination result signal S707 in favor of still images.

The synthesis circuit 708 combines the one-frame motion determination signal S706 for the luminance signal and the one-frame motion determination signal S707 for the chrominance signal together, and outputs the results as the determination signal S708. The switch circuit 109 switches between the inter-line computed luminance signal S103Y and the inter-frame computed luminance signal S106Y according to the determination signal S708. The switch circuit 110 switches between the inter-line computed chrominance signal S103C and the inter-frame computed luminance signal S106C according to the determination signal S708.

Effect

In this embodiment, the oblique correlation detection circuit 104 detects a correlation in an oblique direction of luminance signal components from the video signals over three lines of the input composite video signal. According to the detection results from the oblique correlation detection circuit 104, the one-frame motion determination circuit 706 for the luminance signal attenuates or corrects the output signal S704 of the one-frame motion detection circuit 704 for the luminance signal, to perform the motion determination in favor of still images. Also, the one-frame motion determination circuit 707 for the chrominance signal attenuates or corrects the output signal S705 of the one-frame motion detection circuit 705 for the chrominance signal, to perform the motion determination in favor of still images. Accordingly, even in the event that oblique-direction luminance signal components are contained in the signals S100, S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved. In addition, since the one-frame motion detection results are attenuated or corrected according to the oblique correlation detection results, the precision of the motion detection can be improved. This makes erroneous detection less likely to occur in the motion detection results when an oblique component is input, and thus improves the motion detection precision of the luminance signal in one-frame difference and also improves the motion detection precision of the chrominance signal based on one-frame difference.

Embodiment 7

Internal Configuration of Y/C Separation Device 3

Figure 16:
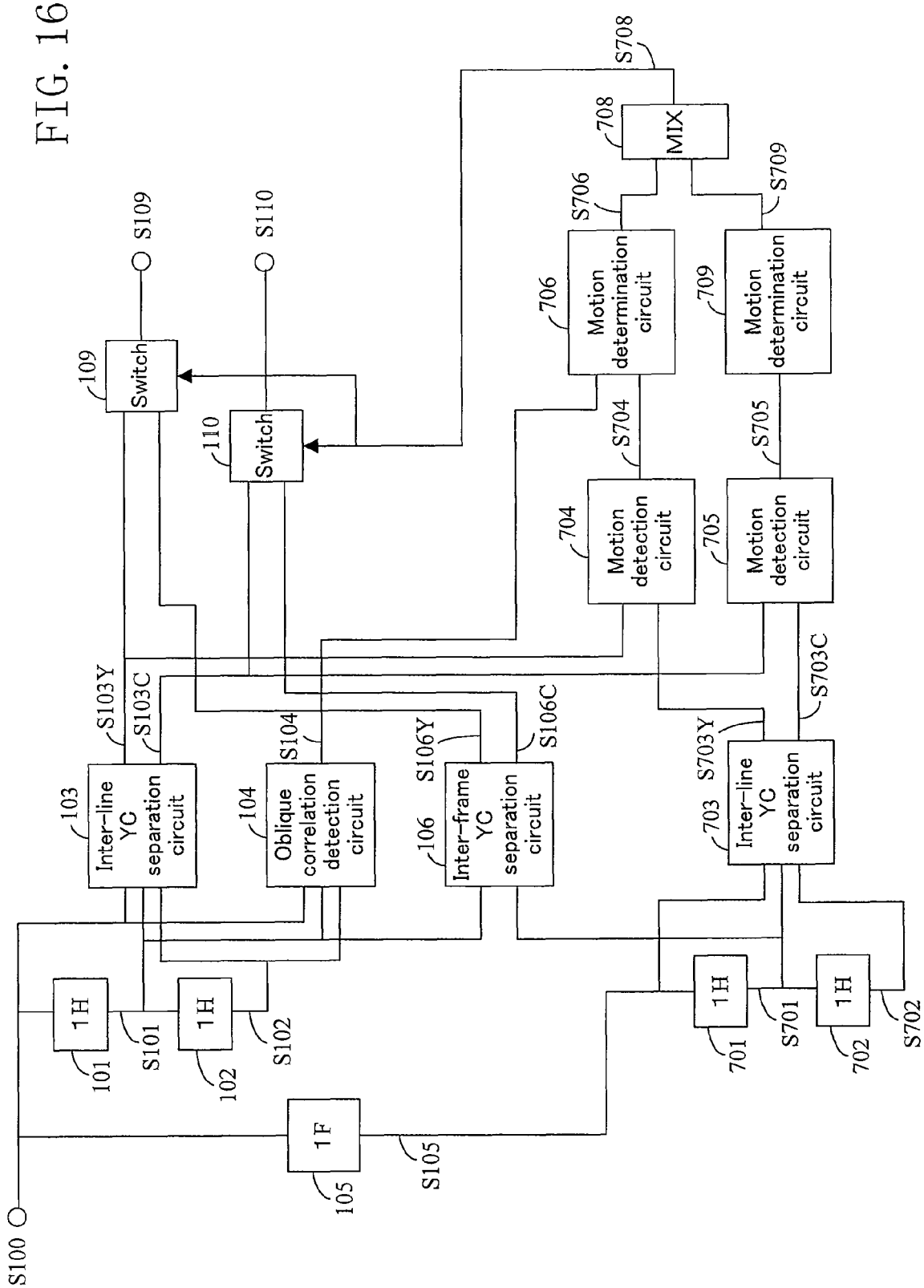
FIG. 16 is a block diagram showing the internal configuration of a Y/C separation device in Embodiment 7.

FIG. 16 shows the internal configuration of the Y/C separation device 3 in Embodiment 7. The Y/C separation device 3 in this embodiment is the same as the Y/C separation device 3 shown in FIG. 15 except that a motion determination circuit 709 is provided in this embodiment in place of the motion determination circuit 707 shown in FIG. 15. The motion detection circuit 709 compares the motion amount S705 detected by the motion detection circuit 705 with a fixed threshold and outputs a determination signal S709 corresponding to the comparison results. The synthesis circuit 708 combines the determination signal S706 output from the motion determination circuit 706 and the determination signal S709 output from the motion determination circuit 709 together (executes OR of these signals), and outputs the results as the determination signal S708.

Operation of Y/C Separation Device 3

The operation of the Y/C separation device 3 configured as described above will be described.

The one-frame motion detection circuit 704 detects a motion amount from the luminance signal S103Y and the luminance signal S703Y having a difference of one frame period therebetween, and outputs the one-frame motion signal S704 for the luminance signal. The one-frame motion determination circuit 706 attenuates or corrects the motion signal S704 according to the oblique correlation detection signal S104. When an oblique component is detected, the motion amount is attenuated, or the threshold for motion determination is raised, to thereby give the motion determination result signal S706 in favor of still images. The one-frame motion detection circuit 705 detects a motion amount from the chrominance signal S103C and the chrominance signal S703C having a difference of one frame period therebetween, and outputs the one-frame motion signal S705 for the chrominance signal. The motion determination circuit 709 compares the motion amount S705 detected by the motion detection circuit 705 with the fixed threshold and outputs the determination signal S709 corresponding to the detection results.

The synthesis circuit 708 combines the one-frame motion determination signal S706 for the luminance signal and the one-frame motion determination signal S709 for the chrominance signal together. The switch circuit 109 switches between the inter-line computed luminance signal S103Y and the inter-frame computed luminance signal S106Y according to the determination signal S708. The switch circuit 110 switches between the inter-line computed chrominance signal S103C and the inter-frame computed chrominance signal S106C according to the determination signal S708.

Effect

In this embodiment, the oblique correlation detection circuit 104 detects a correlation in an oblique direction of luminance signal components from the video signals over three lines of the input composite video signal. According to the detection results from the oblique correlation detection circuit 104, the one-frame motion determination circuit 706 for the luminance signal attenuates or corrects the output signal S704 of the one-frame motion detection circuit 704 for the luminance signal, to perform the motion determination in favor of still images. In addition, the output signal S709 of the one-frame motion determination circuit 709 for the chrominance signal is also used for the final motion determination. Accordingly, even in the event that oblique-direction luminance signal components are contained in the signals S100, S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved. In addition, since the one-frame motion detection results of the luminance signal are attenuated or corrected according to the oblique correlation detection results, the precision of the motion detection of the luminance signal can be improved based on one-frame difference. This makes erroneous detection less likely to occur in the motion detection results when an oblique component is input, and thus improves the motion detection precision of the luminance signal in one-frame difference.

Embodiment 8

Internal Configuration of Y/C Separation Device 3

Figure 17:
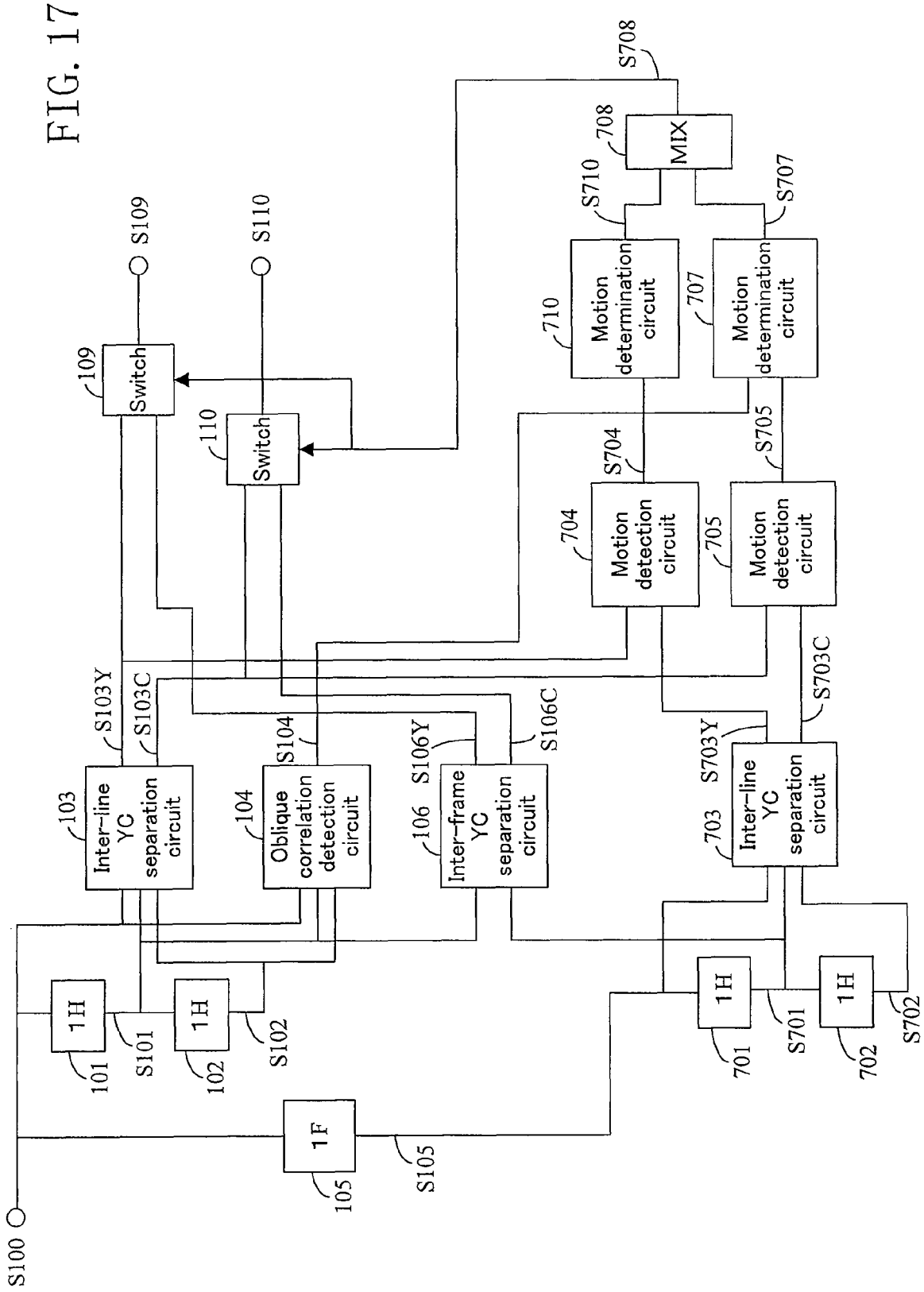
FIG. 17 is a block diagram showing the internal configuration of a Y/C separation device in Embodiment 8.

FIG. 17 shows the internal configuration of the Y/C separation device 3 in Embodiment 8. The Y/C separation device 3 in this embodiment is the same as the Y/C separation device 3 shown in FIG. 15 except that a motion determination circuit 710 is provided in this embodiment in place of the motion determination circuit 706 shown in FIG. 15. The motion determination circuit 710 compares the motion amount S704 detected by the motion detection circuit 704 with a fixed threshold and outputs a determination signal S710 corresponding to the comparison results. The synthesis circuit 708 combines the determination signal S710 output from the motion determination circuit 710 and the determination signal S707 output from the motion determination circuit 707 together (executes OR of these signals), and outputs the results as the determination signal S708.

Operation of Y/C Separation Device 3

The operation of the Y/C separation device 3 configured as described above will be described.

The one-frame motion detection circuit 704 detects a motion amount from the luminance signals S103Y and S703Y having a difference of one frame period therebetween, and outputs the one-frame motion signal S704 for the luminance signal. The one-frame motion determination circuit 710 compares the motion amount S704 detected by the motion detection circuit 704 with the fixed threshold and outputs the determination signal S710 corresponding to the detection results. The one-frame motion detection circuit 705 detects a motion amount from the chrominance signals S103C and S703C having a difference of one frame period therebetween, and outputs the one-frame motion signal S705 for the chrominance signal. The one-frame motion determination circuit 707 attenuates or corrects the motion signal S705 according to the oblique correlation detection signal S104. When an oblique component is detected, the motion amount is attenuated, or the threshold for motion determination is raised, to thereby make the motion determination result signal S707 in favor of still images.

The synthesis circuit 708 combines the one-frame motion determination signal S710 for the luminance signal and the one-frame motion determination signal S707 for the chrominance signal together. The switch circuit 109 switches between the inter-line computed luminance signal S103Y and the inter-frame computed luminance signal S106Y according to the determination signal S708. The switch circuit 110 switches between the inter-line computed chrominance signal S103C and the inter-frame computed luminance signal S106C according to the determination signal S708.

Effect

In this embodiment, the oblique correlation detection circuit 104 detects a correlation in an oblique direction of luminance signal components from the video signals over three lines of the input composite video signal. According to the detection results from the oblique correlation detection circuit 104, the one-frame motion determination circuit 707 attenuates or corrects the output signal S705 of the one-frame motion detection circuit 705 for the chrominance signal, to perform the motion determination in favor of still images. In addition, the output signal S710 of the one-frame motion determination circuit 710 for the luminance signal is also used for the final motion determination. Accordingly, even in the event that oblique-direction luminance signal components are contained in the signals S100, S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved. In addition, since the one-frame motion detection results of the chrominance signal are attenuated or corrected according to the oblique correlation detection results, the precision of the motion detection of the chrominance signal can be improved based on one-frame difference. This makes erroneous detection less likely to occur in the motion detection results when an oblique component is input, and thus improves the motion detection precision of the chrominance signal based on one-frame difference.

Embodiment 9

Internal Configuration of Y/C Separation Device 3

Figure 18:
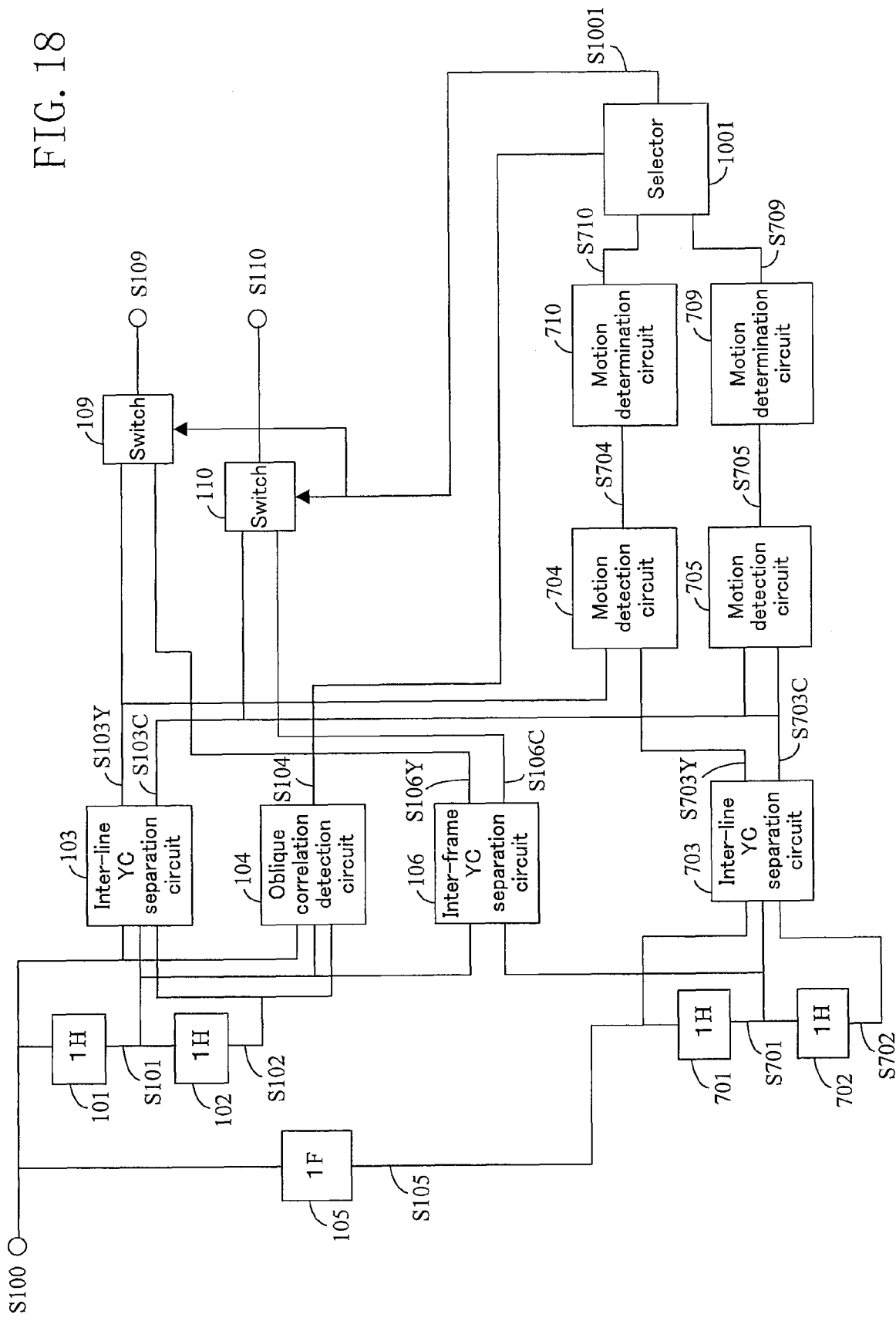
FIG. 18 is a block diagram showing the internal configuration of a Y/C separation device in Embodiment 9.

FIG. 18 shows the internal configuration of the Y/C separation device 3 in Embodiment 9. The Y/C separation device 3 in this embodiment is the same as the Y/C separation device 3 shown in FIG. 15 except that motion determination circuits 710 and 709 and a selector 1001 are provided in this embodiment in place of the motion determination circuits 706 and 707 and the synthesis circuit 708 shown in FIG. 15. The motion detection circuits 710 and 709 respectively compare the motion amounts S704 and S705 detected by the motion detection circuits 704 and 705 with a fixed threshold and output the determination signals S710 and S709 corresponding to the comparison results. The selector 1001 outputs the determination signal S710 output from the motion determination circuit 710 as a determination signal S1001 to the switch circuits 109 and 110 if the signal S104 from the oblique correlation detection circuit 104 indicates that "there is an oblique correlation". If the signal S104 indicates that "there is no oblique correlation", the selector 1001 combines the determination signal S710 output from the motion determination circuit 710 and the determination signal S709 output from the motion determination circuit 709 together (executes OR of these signals) and outputs the combined signal as the determination signal S1001 to the switch circuits 109 and 110.

Operation of Y/C Separation Device 3

The operation of the Y/C separation device 3 configured as described above will be described.

The motion detection circuit 704 detects a motion amount from the luminance signals S103Y and S703Y having a difference of one frame period therebetween, and outputs the one-frame motion signal S704 for the luminance signal. The motion determination circuit 710 compares the motion amount S704 detected by the motion detection circuit 704 with the fixed threshold and outputs the determination signal S710 corresponding to the detection results.

The motion detection circuit 705 detects a motion amount from the chrominance signals S103C and S703C having a difference of one frame period therebetween, and outputs the one-frame motion signal S705 for the chrominance signal. The motion determination circuit 709 compares the motion amount S705 detected by the motion detection circuit 705 with the fixed threshold and outputs the determination signal S709 corresponding to the detection results.

The selector 1001 outputs the motion determination signal S710 as the determination signal S1001 if there is an oblique correlation, and outputs a combined signal of the motion determination signals S710 and S709 as the determination signal S1001 if there is no oblique correction. The switch circuit 109 switches between the inter-line computed luminance signal S103Y and the inter-frame computed luminance signal S106Y according to the determination signal S1001. The switch circuit 110 switches between the inter-line computed chrominance signal S103C and the inter-frame computed luminance signal S106C according to the determination signal S1001.

Effect

As described above, in Embodiment 9, if the oblique correlation detection circuit 104 determines that there is an oblique correlation, the output signal S710 of the motion determination circuit 710 is supplied to the switch circuits 109 and 110 as the determination signal S1001. If the oblique correlation detection circuit 104 determines that there is no oblique correlation, the determination signal S710 from the motion determination circuit 710 and the determination signal S709 from the motion determination circuit 709 are combined together, and the combined signal is output to the switch circuits 109 and 110 as the determination signal S1001. With this configuration of Embodiment 9, the effect obtained by the Y/C separation devices in Embodiments 6 to 8 described above can also be obtained. That is, even in the event that oblique-direction luminance signal components are contained in the signals S100, S101 and S102 input into the three-line correlation YC separation circuit 103 and fail to be correctly separated by the three-line correlation YC separation circuit 103, leaking to the line correlation output chrominance signal S103C, occurrence of cross-color in the output chrominance signal S110 is minimized because the determination is made in favor of the frame correlation YC separation when an oblique line is input, and thus the image quality can be improved.

Embodiment 10

Figure 19:
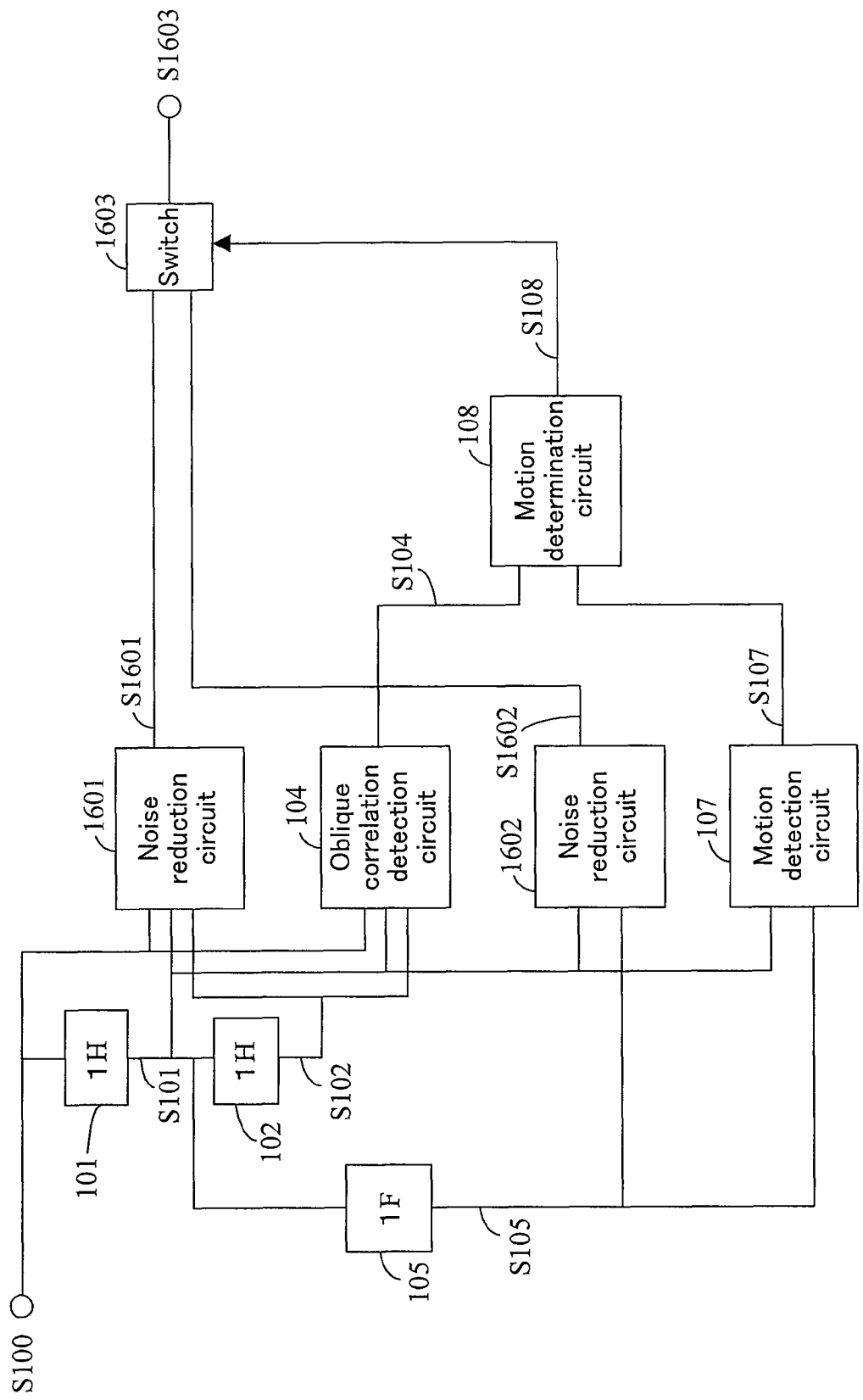
FIG. 19 is a block diagram showing the internal configuration of a noise reduction device in Embodiment 10.
Figure 20:
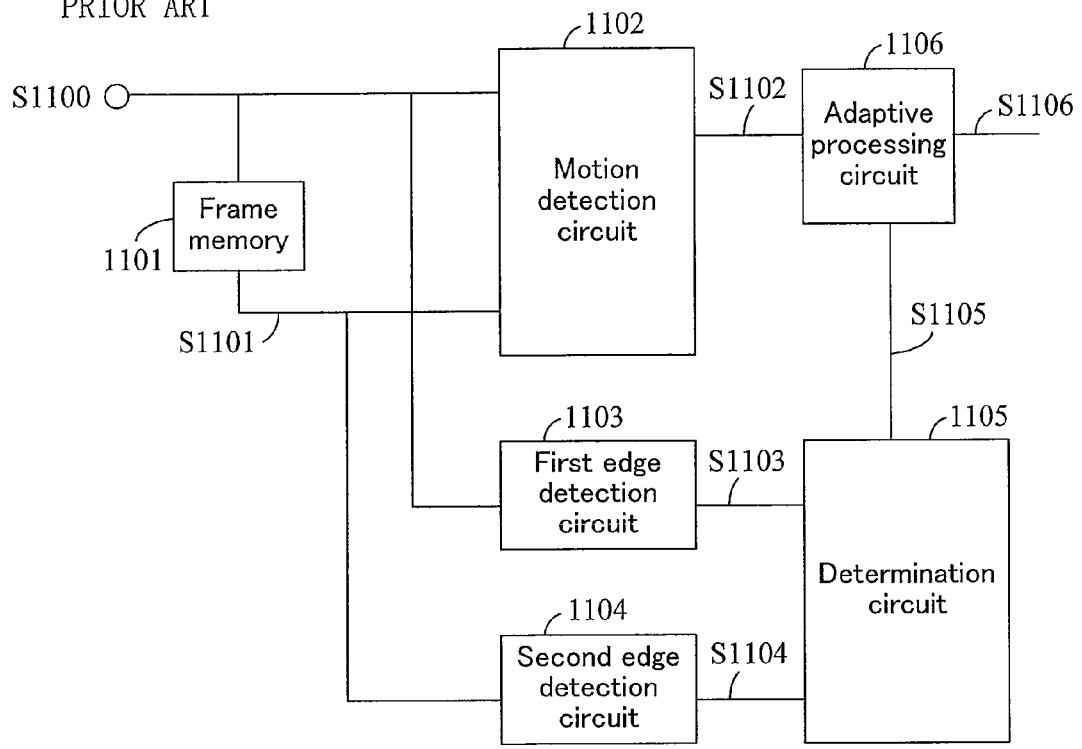
FIG. 20 is a block diagram of a conventional motion processing circuit.
Figure 21:
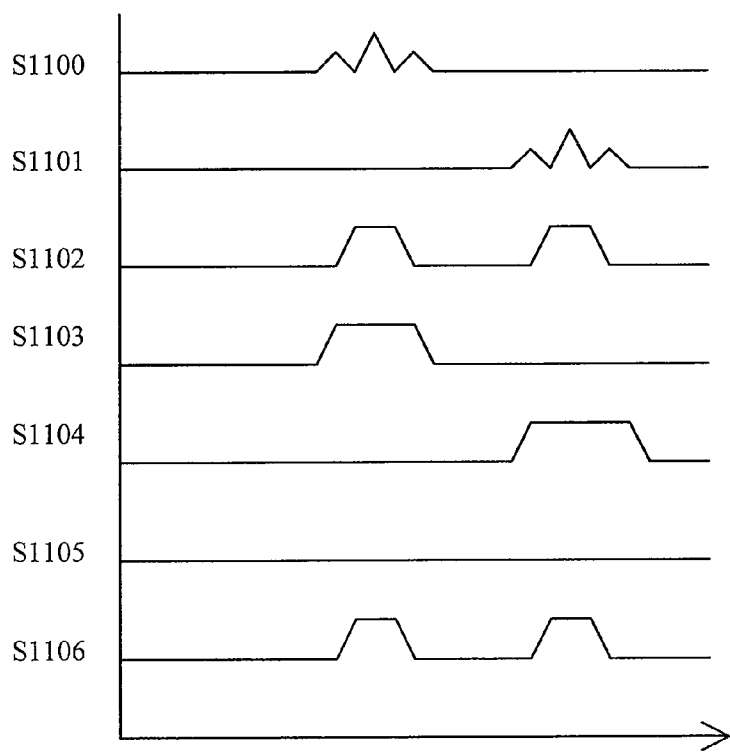
FIG. 21 is a waveform chart illustrating the operation of the conventional motion processing circuit.

FIG. 19 shows a configuration of a noise reduction device in Embodiment 10. The noise reduction device includes line memories 101 and 102, a frame memory 105, noise reduction circuits 1601 and 1602, an oblique correlation detection circuit 104, a motion detection circuit 107, a motion determination circuit 108 and a switch circuit 1603.

The operation of the noise reduction device configured as described above will be described.

The input composite video signal S100 is delayed with the line memories 101 and 102, and the signal S100 and the delayed signals are input into the noise reduction circuit 1601 that uses inter-line correlation. The noise reduction circuit 1601 may be configured to adopt a way of calculating the difference between signals over lines and subtracting the difference value from a reference signal to reduce noise, a way of averaging signals over lines to reduce a noise component or other ways. The noise reduction circuit 1602 receives the signals S101 and S105 having a difference of one frame therebetween for reducing noise using inter-frame correlation. The noise reduction circuit 1602 may be configured to adopt a way of calculating the difference between signals over frames and subtracting the difference value from a reference signal to reduce noise, a way of averaging signals over frames to reduce a noise component or other ways. Either the output S1601 of the noise reduction circuit 1601 or the output S1602 of the noise reduction circuit 1602 is selected according to the output signal S108 of the motion determination circuit 108. Specifically, the switch circuit 1603 selects the output signal S1602 of the noise reduction circuit 602 and outputs this signal as a signal S1603 if the determination signal S108 indicates "still image" (there is no motion), or selects the output signal S1601 of the noise reduction circuit 601 and outputs this signal as the signal S1603 if the determination signal S108 indicates "moving image" (there is a motion).

In this embodiment, the oblique correlation detection circuit 104 detects an oblique-direction correlation of luminance signal components from the video signals over three lines of the input video signal. According to the detection results from the oblique correlation detection circuit 104, the motion determination circuit 108 attenuates or corrects the output signal S107 of the motion detection circuit 107, to perform the motion determination in favor of still images. Accordingly, while degradation in image quality like vertical image blurring along an oblique line is suppressed, noise can be reduced from an image containing a large amount of oblique components in the output signal S1603.

Alternations as those described in Embodiments 2 to 9 made to Embodiment 1 can also be made to this embodiment, and by the alterations, substantially the same effects as those in Embodiments 2 to 9 can be obtained.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A motion detection device comprising:
  an oblique correlation detection section for detecting an oblique correlation of a composite video signal;
  a motion detection section for detecting a motion amount based on an inter-frame difference of the composite video signal; and
  a motion determination section for determining the presence of a motion in the composite video signal based on the motion amount detected by the motion detection section,
  wherein the motion determination section determines the presence of the motion considering the detection results of the oblique correlation obtained by the oblique correlation detection section,
  wherein the motion detection section comprises:
  a first motion detection circuit for detecting a motion amount based on a one-frame difference of the composite video signal; and
  a second motion detection circuit for detecting a motion amount based on a two-frame difference of the composite video signal,
  wherein the motion determination section comprises:
  a first motion determination circuit for determining the presence of a motion in the composite video signal based on the motion amount detected by the first motion detection circuit; and
  a second motion determination circuit for determining the presence of a motion in the composite video signal based on the motion amount detected by the second motion detection circuit, and
  wherein the first and/or second motion determination circuit determines the presence of a motion considering the determination results of the oblique correlation obtained by the oblique correlation detection section.

2. A motion detection device comprising:
  an oblique correlation detection section for detecting an oblique correlation of a composite video signal;
  a motion detection section for detecting a motion amount based on an inter-frame difference of the composite video signal; and
  a motion determination section for determining the presence of a motion in the composite video signal based on the motion amount detected by the motion detection section,
  wherein the motion determination section determines the presence of the motion considering the detection results of the oblique correlation obtained by the oblique correlation detection section,
  wherein the motion detection section comprises:
  a first motion detection circuit for detecting a motion amount based on a one-frame difference of a luminance signal extracted from the composite video signal by luminance/chrominance signal separation using line correlation; and
  a second motion detection circuit for detecting a motion amount based on a one-frame difference of a chrominance signal extracted from the composite video signal by luminance/chrominance signal separation using line correlation, wherein the motion determination section comprises: a first motion determination circuit for determining the presence of a motion in the composite video signal based on the motion amount detected by the first motion detection circuit; and
  a second motion determination circuit for determining the presence of a motion in the composite video signal based on the motion amount detected by the second motion detection circuit, and wherein the first and/or second motion determination circuit determines the presence of a motion considering the determination results of the oblique correlation obtained by the oblique correlation detection section.

3. A motion detection device comprising:
  an oblique correlation detection section for detecting an oblique correlation of a composite video signal;
  a motion detection section for detecting a motion amount based on an inter-frame difference of the composite video signal; and
  a motion determination section for determining the presence of a motion in the composite video signal based on the motion amount detected by the motion detection section,
  wherein the motion determination section determines the presence of the motion considering the detection results of the oblique correlation obtained by the oblique correlation detection section,
  wherein the motion detection section comprises:
  a first motion detection circuit for detecting a motion amount based on a one-frame difference of the composite video signal; and
  a second motion detection circuit for detecting a motion amount based on a two-frame difference of the composite video signal and,
  wherein the motion determination section switches between first determination and second determination according to the detection results of the oblique correlation obtained by the oblique correlation detection section,
  the first determination comprises determining the presence of a motion based on the motion amount detected by the first detection circuit, and
  the second determination comprises determining the presence of a motion based on the motion amount detected by the first motion detection circuit and the motion amount detected by the second motion detection circuit.

4. A motion detection device comprising:
  an oblique correlation detection section for detecting an oblique co elation of a composite video signal;
  a motion detection section for detecting a motion amount based on an inter-frame difference of the composite video signal; and a motion determination section for determining the presence of a motion in the composite video signal based on the motion amount detected by the motion detection section, wherein the motion determination section determines the presence of the motion considering the detection results of the oblique correlation obtained by the oblique correlation detection section, wherein the motion detection section comprises: a first motion detection circuit for detecting a motion amount based on a one-frame difference of a luminance signal extracted from the composite video signal by luminance/chrominance signal separation using line correlation; and a second motion detection circuit for detecting a motion amount based on a one-frame difference of a chrominance signal extracted from the composite video signal by luminance/chrominance signal separation using line correlation, and wherein the motion determination section switches between first determination and second determination according to the detection results of the oblique correlation obtained by the oblique correlation detection section, the first determination comprises determining the presence of a motion based on the motion amount detected by the first detection circuit, and the second determination comprises determining the presence of a motion based on the motion amount detected by the first motion detection circuit and the motion amount detected by the second motion detection circuit.

5. A luminance/chrominance signal separation device comprising: a first luminance/chrominance signal separation section for extracting a first luminance signal and a first chrominance signal using line correlation in the current frame of a composite video signal;

a second luminance/chrominance signal separation section for extracting a second luminance signal and a second chrominance signal using line correlation in the preceding frame of the composite video signal;

the motion detection device of claim 2; and a switch section for combining the first and second luminance signals together according to the determination results from the motion determination section of the motion detection device and outputting the combined signal as a third luminance signal, and combining the first and second chrominance signals according to the determination results from the motion determination section of the motion detection device and outputting the combined signal as a third chrominance signal.

6. A noise reduction device comprising:

a first noise reduction section for reducing noise in a composite video signal using line correlation;

a second noise reduction section for reducing noise in the composite video signal using frame correlation;

the motion detection device of claim 1; and a switch section for combining a video signal obtained from the first noise reduction section and a video signal obtained from the second noise reduction section according to the determination results from the motion determination section of the motion detection device and outputting the combined signal.

7. A motion detection method comprising the steps of:
(a) detecting an oblique correlation of a composite video signal;
(b) detecting a motion amount based on an inter-frame difference of the composite video signal; and
(c) determining the presence of a motion in the composite video signal based on the motion amount detected in the step (b), wherein in the step (c), the presence of a motion is determined considering the detection results of the oblique correlation obtained in the step (a), wherein the step (b) comprises the steps of:
(d) detecting a motion amount based on a one-frame difference of the composite video signal; and
(e) detecting a motion amount based on a two-frame difference of the composite video signal, wherein step (c) comprises the steps of:
(f) determining the presence of a motion in the composite video signal based on the motion amount detected in the step (d); and
(g) determining the presence of a motion in the composite video signal based on the motion amount detected in the step (e), and wherein in the step (f) and/or step (g), the presence of a motion is determined considering the detection results of the oblique correlation obtained in the step (a).

8. A motion detection method comprising the steps of:
(a) detecting an oblique correlation of a composite video signal;
(b) detecting a motion amount based on an inter-frame difference of the composite video signal; and
(c) determining the presence of a motion in the composite video signal based on the motion amount detected in the step (b), wherein in the step (c), the presence of a motion is determined considering the detection results of the oblique correlation obtained in the step (a), wherein the step (b) comprises the steps of:
(d) detecting a motion amount based on a one-frame difference of a luminance signal extracted from the composite video signal by luminance/chrominance signal separation using line correlation; and
(e) detecting a motion amount based on a one-frame difference of a chrominance signal extracted from the composite video signal by luminance/chrominance signal separation using line correlation, wherein the step (c) comprises the steps of:
(f) determining the presence of a motion in the composite video signal based on the motion amount detected in the step (d); and
(g) determining the presence of a motion in the composite video signal based on the motion amount detected in the step (e), wherein the in the step (f) and/or step (g), the presence of the motion is determined considering the detection results of the oblique correlation obtained in the step (a), 9. A motion detection method comprising the steps of:
(a) detecting an oblique correlation of a composite video signal;
(b) detecting a motion amount based on an inter-frame difference of the composite video signal; and
(c) determining the presence of a motion in the composite video signal based on the motion amount detected in the step (b), wherein in the step (c), the presence of a motion is determined considering the detection results of the oblique correlation obtained in the step (a), wherein the step (b) comprises the steps of:
(d) detecting a motion amount based on a one-frame difference of the composite video signal; and
(e) detecting a motion amount based on a two-frame difference of the composite video signal, and wherein in the step (c), switching is made between first determination and second determination according to the detection results of the oblique correlation obtained in the step (a), the first determination comprises determining the presence of a motion based on the motion amount detected in the step (d), and the second determination comprises determining the presence of a motion based on the motion amount detected in the step (d) and the motion amount detected in the step (e).

10. A motion detection method comprising the steps of:
    (a) detecting an oblique correlation of a composite video signal;
    (b) detecting a motion amount based on an inter-frame difference of the composite video signal; and
    (c) determining the presence of a motion in the composite video signal based on the motion amount detected in the step (b),
    wherein in the step (c), the presence of a motion is determined considering the detection results of the oblique correlation obtained in the step (a),
    wherein the step (b) comprises the steps of:
    (d) detecting a motion amount based on a one-frame difference of a luminance signal extracted from the composite video signal by luminance/chrominance signal separation using line correlation; and
    (e) detecting a motion amount based on a one-frame difference of a chrominance signal extracted from the composite video signal by luminance/chrominance signal separation using line correlation, and
    wherein in the step (c), switching is made between first determination and second determination according to the detection results of the oblique correlation obtained in the step (a),
    the first determination comprises determining the presence of a motion based on the motion amount detected in the step (d), and
    the second determination comprises determining the presence of a motion based on the motion amount detected in the step (d) and the motion amount detected in the step (e).

11. A luminance/chrominance signal separation method comprising the steps of:
    (h) extracting a first luminance signal and a first chrominance signal from a composite video signal using line correlation;
    (i) extracting a second luminance signal and a second chrominance signal from the composite video signal using frame correlation;
    the motion detection method of claim 7; and
    (j) combining the first and second luminance signals according to the determination results in the step (c) of the motion detection method and outputting the combined signal as a third luminance signal, and combining the first and second chrominance signals according to the determination results in the step (c) of the motion detection: method and outputting the combined signal as a third chrominance signal.

12. A luminance/chrominance signal separation method comprising the steps of:
    (k) extracting a first luminance signal and a first chrominance signal using line correlation in the current frame of a composite video signal;
    (l) extracting a second luminance signal and a second chrominance signal using line correlation in the preceding frame of the composite video signal;
    the motion detection method of claim 8; and
    (m) combining the first and second luminance signals according to the determination results in the step (c) of the motion detection method and outputting the combined signal as a third luminance signal, and combining the first and second chrominance signals according to the determination results in the step (c) of the motion detection method and outputting the combined signal as a third chrominance signal.

13. A noise reduction method comprising the steps of:
    (n) reducing noise in a composite video signal using line correlation;
    (o) reducing noise in the composite video signal using frame correlation; the motion detection method of claim 7; and
    (p) combining a video signal obtained in the step (n) and a video signal obtained in the step (o) according to the determination results in the step (c) of the motion detection method and outputting the combined signal.

14. A video display device comprising either one of the motion detection device of claim 1, the luminance/chrominance signal separation device of claim 5 and the noise reduction device of claim 6.

15. A video display method comprising either one of the motion detection method of claim 7, the luminance/chrominance signal separation method of claim 11 and the noise reduction method of claim 13.

16. A video display method comprising either one of the motion detection method of claim 7, the luminance/chrominance signal separation method of claim 12 and the noise reduction method of claim 13.

17. A luminance/chrominance signal separation device comprising:
    a first luminance/chrominance signal separation section for extracting a first luminance signal and a first chrominance signal from a composite video signal using line correlation;
    a second luminance/chrominance signal separation section for extracting a second luminance signal and a second chrominance signal from the composite video signal using frame correlation;
    the motion detection device of claim 3; and a switch section for combining the first and second luminance signals together according to the determination results from the motion determination section of the motion detection device and outputting the combined signal as a third luminance signal, and combining the first and second chrominance signals according to the determination results from the motion determination section of the motion detection device and outputting the combined signal as a third chrominance signal.

18. A luminance/chrominance signal separation device comprising: a first luminance/chrominance signal separation section for extracting a first luminance signal and a first chrominance signal using line correlation in the current frame of a composite video signal;
    a second luminance/chrominance signal separation section for extracting a second luminance signal and a second chrominance signal using line correlation in the preceding frame of the composite video signal;
    the motion detection device of claim 4; and
    a switch section for combining the first and second luminance signals together according to the determination results from the motion determination section of the motion detection device and outputting the combined signal as a third luminance signal, and combining the first and second chrominance signals according to the determination results from the motion determination section of the motion detection device and outputting the combined signal as a third chrominance signal.

19. A noise reduction device comprising:
a first noise reduction section for reducing noise in a composite video signal using line correlation;
a second noise reduction section for reducing noise in the composite video signal using frame correlation;
the motion detection device of claim 3; and a switch section for combining a video signal obtained from the first noise reduction section and a video signal obtained from the second noise reduction section according to the determination results from the motion determination section of the motion detection device and outputting the combined signal.

20. A luminance/chrominance signal separation method comprising the steps of:
(h) extracting a first luminance signal and a first chrominance signal from a composite video signal using line correlation;
(i) extracting a second luminance signal and a second chrominance signal from the composite video signal using frame correlation;
the motion detection method of claim 9; and
(j) combining the first and second luminance signals according to the determination results in the step (c) of the motion detection method and outputting the combined signal as a third luminance signal, and combining the first and second chrominance signals according to the determination results in the step (c) of the motion detection method and outputting the combined signal as a third chrominance signal.

21. A luminance/chrominance signal separation method comprising the steps of:
(k) extracting a first luminance signal and a first chrominance signal using line correlation in the current frame of a composite video signal;
(l) extracting a second luminance signal and a second chrominance signal using line correlation in the preceding frame of the composite video signal;
the motion detection method of claim 10; and
(m) combining the first and second luminance signals according to the determination results in the step (c) of the motion detection method and outputting the combined signal as a third luminance signal, and combining the first and second chrominance signals according to the determination results in the step (c) of the motion detection method and outputting the combined signal as a third chrominance signal.

22. A noise reduction method comprising the steps of:
(n) reducing noise in a composite video signal using line correlation;
(o) reducing noise in the composite video signal using frame correlation; the motion detection method of claim 9; and
(p) combining a video signal obtained in the step (n) and a video signal obtained in the step (o) according to the determination results in the step (c) of the motion detection method and outputting the combined signal.

* * * * *